United States Patent
Lange et al.

(10) Patent No.: US 8,673,985 B2
(45) Date of Patent: Mar. 18, 2014

(54) POLYCARBONATE-POLYORGANOSILOXANE-AND/OR POLYURETHANE-POLYORGANOSILOXANE COMPOUNDS

(75) Inventors: Horst Lange, Bochum (DE); Roland Wagner, Bonn (DE); Gunnar Hoffmüller, Leverkusen (DE); Karl-Heinz Sockel, Leverkusen (DE); Walter Simon, Leverkusen (DE)

(73) Assignee: Momentive Performance Materials GmbH, Leverkusen (DE)

( * ) Notice: Subject to any disclaimer, the term of this patent is extended or adjusted under 35 U.S.C. 154(b) by 380 days.

(21) Appl. No.: 12/921,446

(22) PCT Filed: Mar. 5, 2009

(86) PCT No.: PCT/EP2009/052594
§ 371 (c)(1),
(2), (4) Date: Oct. 28, 2010

(87) PCT Pub. No.: WO2009/112418
PCT Pub. Date: Sep. 17, 2009

(65) Prior Publication Data
US 2011/0039948 A1 Feb. 17, 2011

(30) Foreign Application Priority Data
Mar. 11, 2008 (DE) .......................... 10 2008 013 584

(51) Int. Cl.
*C11D 3/37* (2006.01)
*C08L 83/04* (2006.01)
*C09D 183/10* (2006.01)
*A61K 8/90* (2006.01)

(52) U.S. Cl.
USPC .......... 514/772.1; 525/474; 524/540; 510/276

(58) Field of Classification Search
USPC .......... 514/772.1; 525/474; 524/540; 510/276
See application file for complete search history.

(56) References Cited

U.S. PATENT DOCUMENTS

| | | | | |
|---|---|---|---|---|
| 5,606,077 A | * | 2/1997 | Lersch et al. | 549/214 |
| 5,672,338 A | | 9/1997 | Berthiaume | |
| 2007/0092656 A1 | * | 4/2007 | Keul et al. | 427/400 |

FOREIGN PATENT DOCUMENTS

WO WO 02/10257 * 2/2002 ............... A61K 7/48

OTHER PUBLICATIONS

Novi, et al. (Macromol. Chem. Phy. vol. 207, pp. 273-286; 2006).*
Novi et al. "Ammonium-Functionalized Polydimethylsiloxanes: Sythesis and Poperties," Macromolecular Chem. Phys. 2006, 207, pp. 273-286.
Inernational Search Report for corresponding PCT/EP2009/05294 mailed Jun. 23, 2009, three pages.
International Preliminary Report on Patentability for corresponding PCT/EP2009/052594 issued Oct. 5, 2010, six pages.
Novi et al. "Ammonium-Functionalized Polydimethylsiloxanes: Synthesis and Properties," Macromol. Chem. Phys., vol. 207, 2006, pp. 273-286.
International Search Report for corresponding PCT/EP2009/052594, mailed Jun. 23, 2009, three pages.

* cited by examiner

*Primary Examiner* — Anoop Singh
*Assistant Examiner* — Anna Falkowitz
(74) *Attorney, Agent, or Firm* — Rankin, Hill & Clark LLP

(57) ABSTRACT

The present invention relates to novel polycarbonate-polyorganosiloxane and/or polyurethane-polyorganosiloxane compounds, methods for their production, their use, functional formulations containing them, precursors for their production, as well as reactive compositions containing the aforementioned precursors.

22 Claims, No Drawings

POLYCARBONATE-POLYORGANOSILOXANE- AND/OR POLYURETHANE-POLYORGANOSILOXANE COMPOUNDS

The present invention relates to novel polycarbonate-polyorganosiloxane and/or polyurethane-polyorganosiloxane compounds, methods for their production, their use, functional formulations containing them, precursors for their production, as well as reactive compositions containing the aforementioned precursors.

Siloxane block copolymers containing quaternary ammonium structures are widely known. On the one hand, they may be diblock copolymers of the type siloxane/quaternary ammonium unit (DE 3340708, EP 282720, U.S. Pat. Nos. 6,240,929, 6,730,766). On the other hand, triblock copolymers have been developed that are based on the combination siloxane/quaternary ammonium/polyether block unit (WO 02/10256, WO 02/10257, WO 02/10259, WO 2004/090007, WO 03/078504, WO 2004/041912, WO 2004/042136). The most important advantage of these triblock copolymers is that their structure is flexible and can be adapted, within very large ranges, to the concrete product requirements.

Quaternary ammonium compounds containing urea and urethane groups are known from GB 1128642. The reaction of amino or hydroxy-terminated siloxanes with diisocyanates leads to isocyanate-terminated intermediate stages, which then react, for example, with primary-tertiary di or triamines, whereupon the tertiary amino group is quaternized. It is possible to use, for example, oligoethylene glycols as chain extenders, which, however, directly leads to a decrease of the amount of quaternary ammonium groups due to the consumption of isocyanate groups. Thus, this solution is disadvantageous in that a flexible structural adaptation to the concrete product requirements that encompasses large ranges cannot be carried out.

The use of an asymmetrically substituted carbonate as a linker group for the synthesis of siloxane-modified diquaternary compounds containing urethane groups has also been proposed (WO 2005/058863).

The use of this asymmetrically substituted carbonate linker in the synthesis of polyurethane block copolymers containing siloxane units with incorporated amine salt units was also described (C. Novi, A. Mourran, H. Keul, M. Möller, Macromol. Chem. Phys. 2006, 207, 273-286). The drawback of these concrete block copolymers is that they only possess pH-sensitive charges in the form of amine salts, which results in reduced substantivity. A general drawback of this carbonate linker-based approach is the occurrence of free phenol as a leaving group, or the very difficult bonding of the carbonate structure to suitable precursors while completely avoiding phenol.

Moreover, it is known to react carbonate-functionalized siloxanes with hydrocarbons containing primary and secondary amino groups or hydroxyl groups into silicones or corresponding ethers containing urethane groups. The carbonate-functionalized siloxanes are either obtained from olefinically unsaturated carbonates by hydrosilylation with SiH siloxanes (U.S. Pat. Nos. 5,672,338, 5,686,547), or by insertion of $CO_2$ into the epoxy group of epoxy siloxanes (DE 195 05 892). These publications do not contain any references to the synthesis of materials containing quaternary ammonium units.

It is thus the object of the invention to provide novel polycarbonate-polyorganosiloxane and/or polyurethane-polyorganosiloxane compounds which, on the one hand, permit a flexible structural adaptation to the concrete product requirements that encompasses large ranges, and in which, on the other hand, important product properties can be influenced under the influence of donor-acceptor interactions, e.g. by means of the urethane groups. Another object is to show that the aforementioned drawbacks of the prior art, such as the final product containing phenol and the difficulty in accessing suitable precursors for quaternized block copolymers, can be avoided.

The novel polycarbonate-polyorganosiloxane and/or polyurethane-polyorganosiloxane compounds can be produced simply, safely and specifically, and possess novel interesting properties.

The present invention relates to novel polycarbonate-polyorganosiloxane and/or polyurethane-polyorganosiloxane compounds, containing at least one structural element of the formula (1):

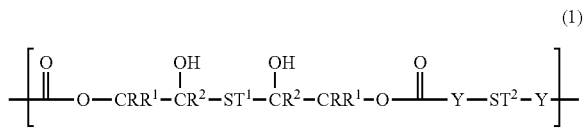

wherein

R is respectively selected from hydrogen, alkyl, or a bond to the residue $ST^1$, with cyclic structures forming if R represents a bond to the residue $ST^1$, $R^1$ is respectively selected from hydrogen, alkyl, or a bond to the residue $ST^1$, with cyclic structures forming if $R^1$ represents a bond to the residue $ST^1$, $R^2$ is respectively selected from hydrogen, alkyl, or a bond to the residue $ST^1$, with cyclic structures forming if $R^1$ represents a bond to the residue $ST^1$, $ST^1$ is a di- or polyvalent, straight-chained, cyclic or branched, saturated, unsaturated or aromatic, substituted or unsubstituted hydrocarbon residue with up to 1000 carbon atoms, which may contain one or more groups selected from:

—O—,

—C(O)—, and a polyorganosiloxane unit with 2 to 1000 silicon atoms, wherein $ST^1$ contains no groups of the formula —O—C(O)—O— and no groups of the formula —O—C(O)—NH—, wherein, if a plurality of residues $ST^1$ is present, they may be the same or different, Y is selected independently from one another from: —O—, —S— and —$NR^6$—, wherein $R^6$ is hydrogen or a straight-chained, cyclic or branched, saturated, unsaturated or aromatic hydrocarbon residue with up to 40 carbon atoms, which may contain one or more groups selected from —O—, —C(O)—, —NH— and —$NR^3$—, wherein $R^3$ is defined as above, $R^6$ represents a bond to the residue $ST^2$ while forming cyclic structures, $ST^2$ is a di- or polyvalent, straight-chained, cyclic or branched, saturated, unsaturated or aromatic, substituted or unsubstituted hydrocarbon residue with up to 1000 carbon atoms, which may contain one or more groups selected from:

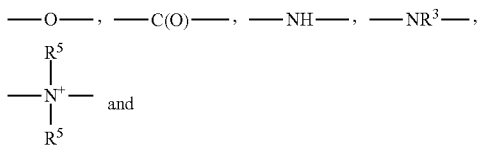

a polyorganosiloxane unit with 2 to 1000 silicon atoms, wherein $R^3$ is a straight-chained, cyclic or branched, saturated, unsaturated or aromatic hydrocarbon residue with up to 40 carbon atoms, which may contain one or more groups selected from —O—, —C(O)— and —NH—, and may optionally be substituted by a silyl group, such as an alkoxysilyl group (for example, a trialkoxysilylgroup), and $R^5$ is a straight-chained, cyclic or branched, saturated, unsaturated or aromatic hydrocarbon residue with up to 100 carbon atoms, which may contain one or more groups selected from —O—, —C(O)— and —NH—, and may optionally be substituted by a silyl group, such as an alkoxysilyl group (for example, a trialkoxysilylgroup), or two residues $R^5$ form, with the nitrogen atom to which they are bonded, a 5 to 7-membered ring, which may optionally contain one or two further hetero atoms, or $R^5$, together with $R^6$, forms a divalent alkylene residue which leads to the formation of a cyclic structure including Y and $ST^2$, wherein, if a plurality of residues $ST^2$ is present, they may be the same or different, provided that at least one of the residues $ST^1$ and/or $ST^2$ comprises a polyorganosiloxane residue, or acid addition compounds and/or salts thereof.

Preferably, Y represents —O— and —NR$^6$—, wherein $R^6$ preferably is hydrogen or a straight-chained, cyclic or branched, saturated, unsaturated or aromatic hydrocarbon residue with up to 20 carbon atoms, which may contain one or more groups selected from —O—, —C(O)—, —NH— and —NR$^3$—, wherein $R^3$ is defined as below, and/or $R^6$ forms a bond to the residue $ST^2$, whereby cyclic structures form. In the process, the bond from $R^6$ to the residue $ST^2$ preferably takes place via a residue $R^5$.

$ST^1$ preferably is a di- or polyvalent, straight-chained, cyclic or branched, saturated, unsaturated or aromatic, substituted or unsubstituted hydrocarbon residue with up to 400 carbon atoms, which may contain one or more groups selected from:

—O—,

—C(O)—, and a polyorganosiloxane unit with 2 to 500 silicon atoms, $ST^2$ preferably is a di- or polyvalent, straight-chained, cyclic or branched, saturated, unsaturated or aromatic, substituted or unsubstituted hydrocarbon residue with up to 400 carbon atoms, which may contain one or more groups selected from:

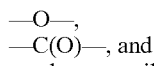

a polyorganosiloxane unit with 2 to 500 silicon atoms, wherein $R^3$ is a straight-chained, cyclic or branched, saturated, unsaturated or aromatic hydrocarbon residue with up to 20 carbon atoms, which may contain one or more groups selected from —O—, —C(O)— and —NH—, and $R^5$ is a straight-chained, cyclic or branched, saturated, unsaturated or aromatic hydrocarbon residue with up to 20 carbon atoms, which may contain one or more groups selected from —O—, —C(O)— and —NH—, or two residues $R^5$ form, with the nitrogen atom to which they are bonded, a 5 to 7-membered ring, which may optionally contain one or two further hetero atoms, or $R^5$, together with $R^6$, forms a divalent alkylene residue which leads to the formation of a cyclic structure including Y and $ST^2$.

The case in which $R^5$, together with $R^6$, forms a divalent alkylene residue which leads to the formation of a cyclic structure including Y and $ST^2$ arises, for example, when—as will be shown in more detail below—methylpiperazine, for example, is used as the starting compound HY-ST$^3$-NR$^5_2$ for preparing the compounds according to the invention, wherein Y=—NR$^6$ and $R^6$, together with $R^5$, forms an alkylene residue.

Acid addition compound are such compounds which are created by optionally partial neutralization of amino-containing compounds according to the invention with inorganic or organic proton acids, such as hydrochloric acid, sulfuric acid, phosphoric acid, C1 to C22 carboxylic acids, such as acetic acid etc.

Salts of the compounds according to the invention in particular result from the presence of quaternary ammonium groups which require an anion for the neutralization of the positive charge. Such anion particularly include: carboxylate anions such as acetate, stearate, oleate, undecanoate, dodeeanoate etc., halogen anions, such as, in particular, chloride, bromide, iodide, sulfate, hydrogensulfate, phosphate, In the compounds according to the invention, protonated ammonium groups (H—N$^+$) and quaternized ammonium groups (NR$_4^+$) may be present at the same time.

In a preferred embodiment of the compounds according to the invention, at least one of the residues R, $R^1$ and $R^2$ represents hydrogen. Preferably, residues R, $R^1$ and $R^2$ represent hydrogen, so that compounds of the formula (1a)

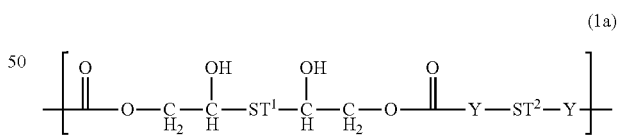

(1a)

result.

In a preferred embodiment of the invention, the compounds according to the invention have a linear structure. In this case, a linear structure means that the polymer main chain formed from the units of the formular (I) is substantially linear, i.e. has no branchings. However, this does permit cyclic structural elements being contained in the linear polymeric main chain.

In a preferred embodiment of the invention, the residues $ST^1$ and $ST^2$ are each divalent residues. This means that the compounds according to the invention are linear compounds and that there are no cyclic structures including $R^1$ and $ST^1$.

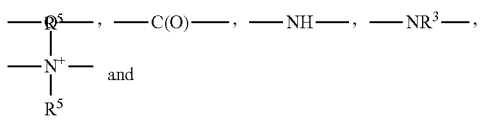

Branched polycarbonate-polyorganosiloxane and/or polyurethane-polyorganosiloxane compounds are included in the compounds according to the invention, in particular those in which the branching of the polymeric main chain takes place via at least one of the residues $ST^1$ or $ST^2$, which in this case must naturally be more than divalent.

Linear compounds are obtained, in particular, starting from starting compounds of the formulae

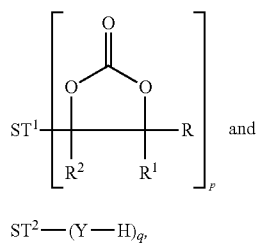
(6)

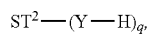
(7)

wherein $ST^1$, R, $ST^2$ and Y are defined as above, and wherein p and q are each 2. Branched compounds according to the invention are obtained, in particular, by using the aforementioned starting compounds, in which q and/or p>2.

However, branched compounds according to the invention can also be obtained by later reacting or cross-linking reactive groups in the polymeric main chain.

For example, by reacting

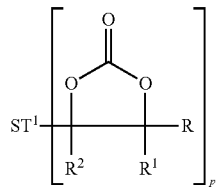

wherein p=2,
and
$ST^2$-$(Y—H)_q$, which is, for example, a compound of the formula $NH_2CH_2CH_2N(CH_3)CH_2CH_2NH_2$, $NH_2CH_2CH_2CH_2N(CH_3)CH_2CH_2CH_2NH_2$ or aminoethylpiperazine, compounds of the formula (1b):

can be obtained, wherein the tertiary amino groups in $ST^2$ can be reacted or cross-linked, for example, by polyfunctional quaternating agents, such as $ST^{4V}(-Q)_t$.

Moreover, it is also possible to cross-link the compounds according to the invention later by means of the hydroxyl groups present using polyisocyanates, polycarboxylic acids or derivatives thereof, such as acid chlorides, or polyepoxides.

The polycarbonate-polyorganosiloxane and/or polyurethane-polyorganosiloxane compounds according to the invention contain at least one polyorganosiloxane residue, which preferably has the formula (2):

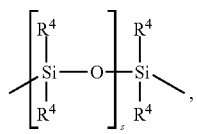
(2)

wherein
$R^4$ is a straight-chained, cyclic or branched, saturated, unsaturated or aromatic hydrocarbon residue with up to 20 carbon atoms, and/or $R^4$ is an alkoxy residue, the alkyl part of which is a straight-chained, cyclic or branched, saturated alkyl residue with up to 20 carbon atoms, which may contain one or more oxygen atoms (such as, for example, in the case of polyalkyleneoxyalkoxy residues), and
s=1 to 999.

Preferred are
$R^4$ C1 to C20, preferably C1 to C9, straight-chained or cyclic or branched, saturated or unsaturated or aromatic hydrocarbon residue, particularly preferably methyl and phenyl and
s 1 to 199, especially 1 to 99.

In a particularly preferred case, the siloxane unit (2) has the structure

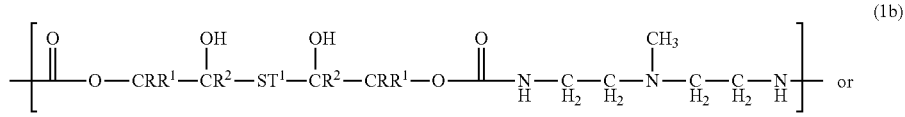
(1b)

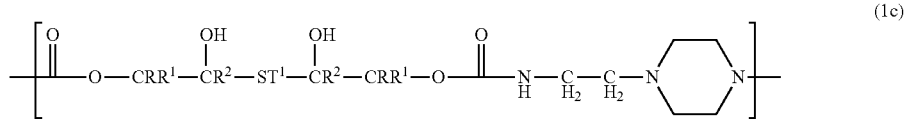
(1c)

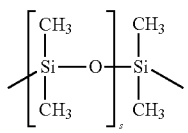

wherein s is as specified above.

The following compound, for example, constitutes a compound $ST^2\text{-}(Y\text{—}H)_q$ corresponding to the alternative $R^4$=alkoxy and/or alkyl:

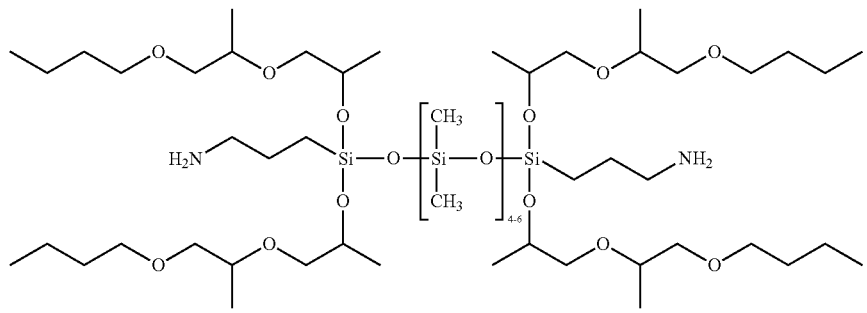

In an embodiment that is particularly suitable for the use of the compounds according to the invention in the field of cosmetics, such as in the field of hair care, s is preferably >199.

In an embodiment that is particularly preferred for the use of the compounds according to the invention as softeners, in particular for textiles, s is preferably 20 to 200, particularly preferably 20 to 120.

Particularly preferably, the polycarbonate-polyorganosiloxane and/or polyurethane-polyorganosiloxane compounds according to the invention contain at least two polyorganosiloxane residues of the formula (2).

Preferably, the polycarbonate-polyorganosiloxane and/or polyurethane-polyorganosiloxane compounds according to the invention contain at least two structural elements of the formula (1), more preferably at least 3 structural elements of the formula (1).

However, it is also included in the scope of the invention that the compounds according to the invention have only one structural element of the formula (1), which sometimes are also referred to as "butterfly" compounds. Examples for such compounds include:

(a compound resulting from the reaction of 1 mol

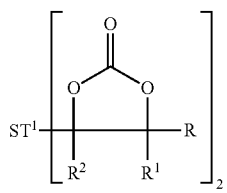

and 2 mol $ST^2\text{-}(Y\text{—}H)_2$).

A more complex butterfly structure is formed by stepped reaction of $ST^2\text{-}(Y\text{—}H)_2$ with

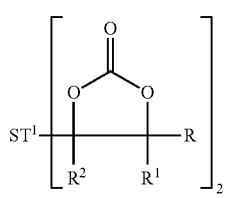

and subsequent reaction with $HY\text{-}ST^3\text{-}NR^5{}_2$ and $ST^{4V}(\text{-}Q)_2$:

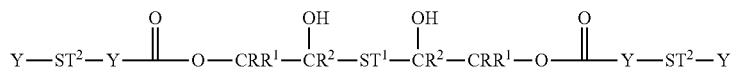

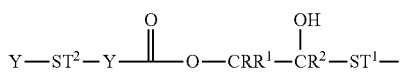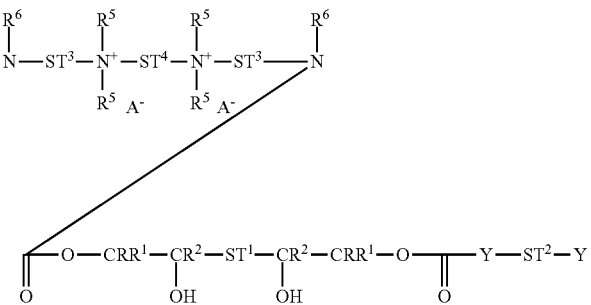

The above reaction also illustrates a possibility of forming terminal groups of the compounds according to the invention. The terminal groups can result from either the non-reacted terminal groups of the polyfunctional monomers used, or reactive monofunctional compounds, such as, for example, CH-acid compounds, such as alcohols, amines, or water, or acids, are added for chain termination.

In the polyurethane-polyorganosiloxane compounds according to the invention, Y=preferably —$NR^6$—, wherein $R^6$ is defined as above. Particularly preferably Y=—NH—.

The polycarbonate-polyorganosiloxane and/or polyurethane-polyorganosiloxane compounds preferably comprise amino groups, protonated amino groups, quaternary ammonium groups and/or polyether groups. Particularly preferably, they comprise quaternary ammonium groups and/or polyether groups, because they impart sufficient hydrophilicity to the compounds according to the invention with good substantivity.

In the polycarbonate-polyorganosiloxane and/or polyurethane-polyorganosiloxane compounds according to the invention, $ST^1$ is preferably unequal to $ST^2$.

In a preferred embodiment of the polycarbonate-polyorganosiloxane and/or polyurethane-polyorganosiloxane compounds, $ST^1$ and/or $ST^2$ are selected from the group consisting of polyorganosiloxane-containing residues, polyether-containing residues, polyorganosiloxane and polyether-containing residues, monocyclic or polycyclic hydrocarbon residues, acyclic, optionally oxygen-containing hydrocarbon residues and optionally oxygen-containing hydrocarbon residues comprising aromatic groups. Preferably, at least one of the residues $ST^1$ and/or $ST^2$ contains a polyalkyleneoxy group.

In a further preferred embodiment of the invention the polycarbonate-polyorganosiloxane and/or polyurethane-polyorganosiloxane compounds containing $ST^1$ and/or $ST^2$ contain a structural element of the following formula:

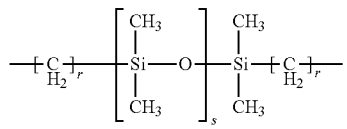

wherein s is defined as above, and
r=1 to 12.

The polycarbonate-polyorganosiloxane and/or polyurethane-polyorganosiloxane compounds according to the invention are in particular prepared by reacting a compound of the formula (6)

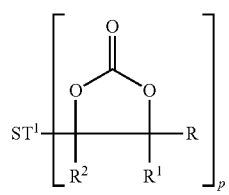 (6)

wherein R, $R^1$, $R^2$ and $ST^1$ are defined as above, and p≥2, preferably p=2, with at least one compound of the formula (7)

$$ST^2\text{-}(Y\text{—}H)_q \tag{7}$$

wherein $ST^2$ and Y are defined as above, and wherein q 2, preferably q=2. In this case, Y=$NR^6$ wherein $R^6$ is as defined above, preferably hydrogen.

In a further preferred embodiment of the invention, the polycarbonate-polyorganosiloxane and/or polyurethane-polysiloxane compounds have at least one residue $ST^2$ of the formula (5):

wherein $R^5$ is defined as above, $ST^3$ is a straight-chained or cyclic or branched, saturated or unsaturated or aromatic, substituted or unsubstituted hydrocarbon residue with 2 to 100 carbon atoms, which may contain —O—, —C(O)—, —NH— and/or —$NR^3$—, wherein $R^3$ is defined as above, and $ST^4$ is a straight-chained or cyclic or branched, saturated or unsaturated or aromatic, substituted or unsubstituted hydrocarbon residue with 2 to 200 carbon atoms, which may contain —O—, —C(O)—, —NH— and/or —$NR^3$—, and/or a polyorganosiloxane unit with 2 to 500, preferably 2 to 200 silicon atoms, wherein $R^3$ is defined as above, and $A^-$ represents an organic or inorganic anion.

Substituents of the hydrocarbon residues for $ST^3$ and $ST^4$ include one or more, preferably one to three substituents, which are preferably selected from the group consisting of: hydroxy, halogen, such as fluorine or chlorine, and cyano. In this case, hydroxy is particularly preferred, in particular in $ST^4$.

Including the formula (2), formula (3) preferably results for the quaternized polycarbonate-polyorganosiloxane and/or polyurethane-polyorganosiloxane compounds according to the invention:

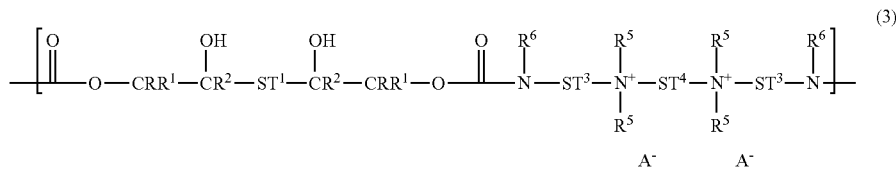
(3)

wherein
R, $R^1$, $R^2$, $ST^1$, $ST^3$, $ST^4$, $R^6$ and $R^5$ are defined as above, and
$A^-$ is an organic or inorganic anion,
provided that at least one of the residues $ST^1$, $ST^3$ and $ST^4$ contains a polyorganosiloxane residue.

The above-described compounds according to the invention are preferably prepared by a method comprising the reaction of a compound of the formula

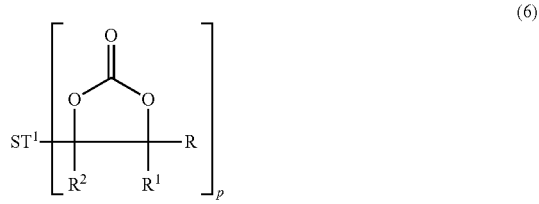
(6)

wherein R, $R^1$, $R^2$ and $ST^1$ are defined as above, and p≥2, preferably p=2, with a compound of the formula (8)

HY-ST³-NR⁵₂     (8), wherein $ST^3$, Y and $R^5$ are defined as above,
and a compound of the formula (9)

$ST^{4V}(-Q)_t$     (9), wherein
Q is a residue capable of alkylating an amino group, $ST^{4V}$, together with the molecule part arising from Q after the quaternating reaction, forms the residue $ST^4$, and t≥2, preferably t=2.

Preferably, $Y=NR^6$, wherein $R^6$ is as defined above, preferably hydrogen.

The reaction partners HY-ST³-NR₂ introducing $ST^3$ are substances having primary-tertiary or secondary-tertiary diamino-structures, such as, for example, N,N-dimethylpropylenediamine. The use of N-methypiperazine, which is also preferred, includes the possibility that was treated above, namely of cyclic structures that comprise Y and $ST^2$ being able to form. Thus, using N-methylpiperazine as HY-ST³-NR⁵₂ (Y=NR⁶, ST³=-CH₂—CH₂—, R⁵=—CH₃ and R⁵ and R⁶ form —CH₂—CH₂—) compounds of the formula (3a) form, for example The use of primary-secondary diamines for introducing $ST^3$ is also possible in principle. Remaining amino groups can subsequently be quaternized to the chain structure. The use of $ST^3$ precursors with primary or secondary amino groups leads to the formation of polyurethanes.

Alternatively, tertiary amino-functionalized alcohols, such as HOCH₂CH₂N(CH₃)₂ can also be used for introducing $ST^3$. In this case, polycarbonates (carbonic acid esters) are formed.

It lies within the scope of the invention to use higher-functional amines with at least two tertiary amine functions for producing branched $ST^3$ structures. Examples include:

N,N,N,N'-tetramethyldipropylenetriamine (Jeffcat ZR50B Huntsman) and

N,N,N',N'-tetramethyldiethylenetriamine.

The reaction partners $ST^{4V}(-Q)_t$ containing $ST^4$ are polyfunctional, in particular difunctional alkylating agents which preferably possess epoxy groups, halocarboxylic acid ester groups and haloalkyl groups.

More preferably, the hydrocarbon-based epoxide derivatives are
hydrocarbon diepoxides, e.g. vinylcyclohexenediepoxide
epichlorohydrin
epoxy-terminated polyethers, preferably ethyleneoxide- and propyleneoxide-based polyethers, for example glycidyl-terminated polyethers
epoxy-terminated polyesters,
epoxy-terminated polycarbonates The halogen-functionalized hydrocarbon derivatives, preferably chlorides and bromides, preferably are
Hydrocarbon dihalides, optionally interrupted by polyorgano-siloxane units,
halogen-terminated polyethers, preferably ethyleneoxide- and propyleneoxide-based
polyethers
Halocarboxylic acid esters of hydrocarbon diols and polyethers, preferably ethyleneoxide- and propyleneoxide-based polyethers, especially chloroacetic acid esters, chloropropionic acid esters and chlorobutanoic acid esters of hydrocarbon diols and polyethers.

It also lies within the scope of the invention to transfer difunctional acid alkoxylates into corresponding glycidyl, halogen or halocarboxylic acid esters derivatives and use them according to the invention. They are derived, for

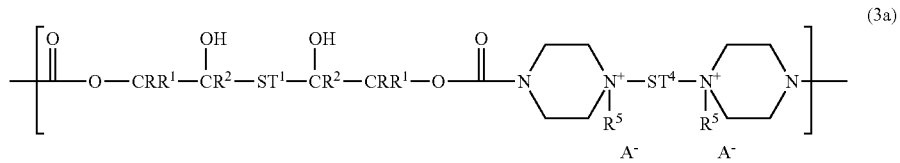
(3a)

example, from succinic acid. Examples for such compounds include:

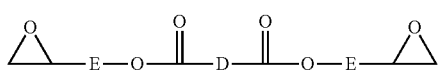

wherein D is an aliphatic or aromatic, optionally substituted hydrocarbon residue, such as, for example:

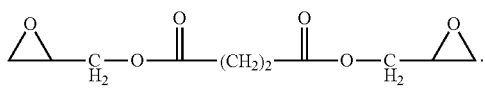

The synthesis of the particularly preferred chlorocarboxylic acids is carried out in the known manner (Organikum, Organisch-Chemisches Grundpraldikum, 17. edition, VEB Deutscher Verlag der Wissenschaften, Berlin 1988, pp. 402-408) by reaction of the diol component with the corresponding halocarboxylic acid anhydrides or halocarboxylic acid chlorides.

In another embodiment, the hydrocarbon residues $ST^4$ are more complex α,ω-epoxy- or halogen-terminates structures derived from α,ω-hydroxyl-functionalized prepolymers.

Preferably, these α,ω-hydroxyl-functionalized prepolymers are the reaction products of
  diols with diisocyanates
  OH-terminated polyethers, preferably ethyleneoxide- and propyleneoxide-based
   polyethers with diisocyanates,
  OH-terminated polyesters
  OH-terminated polycarbonates.

In a preferred embodiment, these α,ω-hydroxyl-functionalized prepolymers are transferred into the corresponding α,ω-halocarboxylic acid esters, especially chloroacetic acid esters, chloropropionic acid esters and chlorobutanoic acid esters.

The introduction according to the invention of siloxane blocks into $ST^4$ preferably takes place via
  α,ω-epoxy-terminated siloxanes, preferably α,ω-glycidyl- and epoxycyclo-hexyl-terminated siloxanes,
  α,ω-halogenalkyl-terminated siloxanes, preferably chloropropyl- and chloropropenyl-terminated siloxanes,
  α,ω-halocarboxylic-acid-ester-terminated siloxanes, preferably esters of chloroacetic acid, chloropropionic acid and chlorobutanoic acid,
  α,ω-halocarboxylic-acid-ester-terminated polyethersiloxanes, preferably esters of chloroacetic acid, chloropropionic acid and chlorobutanoic The preparation of the α,ω-epoxy-terminated siloxanes and α,ω-halogenalkyl-terminated siloxanes introduced into $ST^4$ is described in the prior art (Silicone, Chemie and Technologie, Vulkan Verlag Essen 1989, pp. 85-90 and 120).

The preparation of α,ω-halocarboxylic-acid-ester-terminated siloxanes can be carried out in analogy to the procedure according to WO 02/10256, Example 1. In this case, SiH siloxanes are reacted with halocarboxylic acid esters of olefinically or acetylenically unsaturated alcohols.

The preparation of α,ω-halocarboxylic-acid-ester-terminated polyethersiloxanes can be carried out in analogy to WO 02/10257, Example 1. In this case, SiH siloxanes are reacted with halocarboxylic acid esters of olefinically or acetylenically unsaturated polyethers. Alternatively, it is possible to react polyethersiloxanes with halocarboxylic acids, their anhydrides or acid chlorides (U.S. Pat. Nos. 5,153,294, 5,166,297).

In another embodiment, the introduction of siloxane blocks into $ST^4$ is carried out via α,ω-epoxy- or halogen-functionalized siloxane prepolymers, which can preferably be obtained from the corresponding α,ω-hydroxyalkyl or α,ω-hydroxypolyether-terminated siloxane prepolymers.

These OH-terminated siloxane-containing prepolymers are preferably obtained by reaction of
  α,ω-hydroxyalkyl-terminated siloxanes with diisocyanates,
  α,ω-polyether-terminated siloxanes with diisocyanates,
and then transferred into the epoxy and halogen derivatives.

The α,ω-halocarboxylic-acid-functionalized siloxane prepolymers, which are available by esterification with, for example, the anhydrides or acid chlorides, constitute a preferred embodiment. In a special embodiment, hydrocarbon- and siloxane-based prepolymers for $ST^4$ can be obtained by α,ω-epoxy- or halogen-functionalized precursors being made to react with a stoichiometric deficit of bis-secondary amines, e.g. piperazine, or bis-secondary aminofunctional siloxanes, for example:

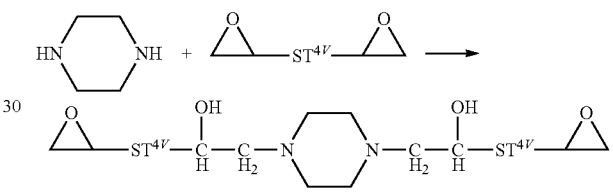

In another special embodiment, hydrocarbon- and siloxane-based prepolymers for $ST^4$ can be obtained by alpha, omega-epoxy-functionalized precursors being made to react with a stoichiometric deficit of primary amines, e.g. ethanolamine, $NH_2CH_2CH_2CH_2Si(CH_3)_2OSi(CH_3)_3$ or $NH_2CH_2CH_2CH_2Si[OCH(CH_3)_2]_3$. For example, this opens up the possibility of introducing specifically siloxane, silane or even reactive alkoxysilane structures into $ST^4$, for instance:

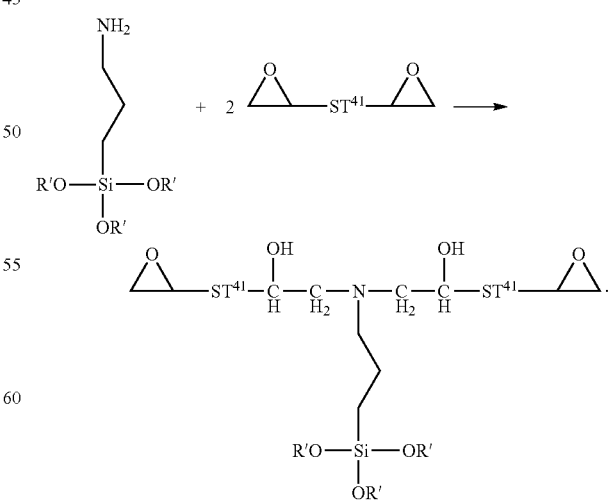

Moreover, it lies within the scope of the invention to use higher-functional hydrocarbon- or siloxane-based substances for forming the residue $ST^4$. These materials contain more than two of the epoxy or halogen functions treated above.

Examples for higher-functional hydrocarbon-based substances include the glycidyl or chloroacetic acid ester derivatives of glycerol, pentaerythrol, sorbitol and of their ethoxylates/propoxylates. It also lies within the scope of the invention to transfer higher-functional acid alkoxylates into corresponding glycidyl or chloroacetic acid ester derivatives and use them according to the invention. They are derived, for example, from trimellitic acid or pyromellitic acid.

Suitable higher-functional siloxane-based substances with $\alpha,\omega$- and/or comb-like epoxy- or halogen-, preferably halocarboxylic acid ester substitution can be obtained, for example, from hydroxy-functional precursors which are available by addition of allylalcohol, butynediol and the alkoxylates of allylalcohol or butynediol to corresponding SiH-siloxanes. Alternatively, unsaturated epoxy- or halocarboxylic acid ester-functional precursors, for example, can be added to corresponding SiH siloxanes.

What is important is that the functionality of these higher-functional hydrocarbon-based or siloxane-based substances is greater than 2.

Moreover, it lies within the scope of the invention to use monofunctional hydrocarbon-based or siloxane-based substances for forming the residue $ST^4$. These materials contain one of the epoxy or halogen functions treated above. Examples of monofunctional hydrocarbon-based substances are the glycidyl or chloroacetic acid ester derivatives of alkanols, for example ethanol, 2-propanol, dodecanol and octadecanol, alkenols, for example allylalcohols, hexenol, oleylalcohol and alkinols, for example propinol and the alkoxylates, especially ethoxylates/propoxylates of the aforementioned monofunctional alcohols. It also lies within the scope of the invention to transfer fatty acid alkoxylates into corresponding glycidyl or chloroacetic acid ester derivatives and use them according to the invention.

Suitable monofunctional siloxane-based substances with epoxy- or halogen-, preferably halocarboxylic acid ester substitution are known, for example, from WO 02/10256. They can be obtained, for example, from unsaturated epoxy- or halocarboxylic-acid-ester-functional precursors, which are added to corresponding SiH siloxanes.

If epoxy-containing substances are used for introducing $ST^4$, acid is added in stoichiometric amounts in the manner known from the prior art. The anions $A^-$ are inorganic anions, such as halogenides, especially chloride, and organic anions, such as carboxylate, especially C2 to C18-carboxylate, alkylpolyethercarboxylate, alkylsulfate, especially methosulfate, sulfonate, especially alkylsulfonate and alkylarylsulfonate, in particular tolylsulfonate.

The molecules for introducing $ST^1$ are poly-, in particular difunctional cyclocarbonate precursors. They are derived from hydrocarbon- or siloxane-based structures.

In a preferred embodiment, the hydrocarbon- or siloxane-based cyclocarbonate precursors are derived from epoxy-functionalized derivatives. They can be transferred into the corresponding cyclocarbonates by base-catalyzed insertion of $CO_2$ into the epoxide ring (DE 195 05 892). Thus, the above-described compounds of the formula (10), for example, are also suitable as epoxy-functionalized derivatives for reaction with $CO_2$ $$Q\text{-}ST^{4V}\text{-}Q \tag{10}$$

The epoxy derivatives that lead to the cyclocarbonates yielding $ST^1$ preferably are hydrocarbon diepoxides, e.g. vinylcyclohexenediepoxide
 epoxy-terminated polyethers, preferably ethyleneoxide- and propyleneoxide-based polyethers, for example glycidyl-terminated polyethers
 epoxy-terminated polyesters,
 epoxy-terminated polycarbonates It also lies within the scope of the invention to transfer difunctional acid alkoxylates into corresponding glycidyl derivatives and use them according to the invention. They are derived, for example, from succinic acid.

In another embodiment, the hydrocarbon residues $ST^1$ are structures derived from more complex $\alpha,\omega$-epoxide prepolymers.

They in turn are derived from $\alpha,\omega$-hydroxy-functionalized prepolymers, for example from the reaction products of
 diols with diisocyanates
 OH-terminated polyethers, preferably ethyleneoxide- and propyleneoxide-based polyethers with diisocyanates,
 OH-terminated polyesters,
 OH-terminated polycarbonates,
which can be transferred into epoxides, for example by reaction with epichlorohydrin. The siloxane-based epoxy derivatives that lead to the cyclocarbonates yielding $ST^1$ preferably are
 $\alpha,\omega$-epoxy-terminated siloxanes, preferably $\alpha,\omega$-glycidyl- and epoxycyclohexyl-terminated siloxanes, the synthesis of which was already discussed in connection with $ST^4$ precursors.

In another embodiment, the siloxane-based epoxy precursors may be $\alpha,\omega$-epoxy derivatives of $\alpha,\omega$-hydroxypolyether-terminated siloxane prepolymers.

In another preferred embodiment, the hydrocarbon- or siloxane-based cyclocarbonate precursors are derived from corresponding bis-1,2-diol-functionalized derivatives. They can be transferred into the corresponding cyclocarbonates by reaction with phosgene or catalyzed transesterification with diallylcarbonates, for example dimethylcarbonate (DE 195 05 892).

The bis-1,2-diol derivatives leading to the $ST^1$-yielding cyclocarbonates preferably are diglycerin, higher oligoglycerins, or bis-glycerol-terminated ethers or polyether structures. It also lies within the scope of the invention to transfer difunctional acids into corresponding bis-1,2-diol derivatives. Examples for this include corresponding bis-glycerol exters of dicarboxylic acids, e.g. of succinic acid.

The siloxane-based bis-1,2-diol derivatives leading to the $ST^1$-yielding cyclocarbonates preferably are
 $\alpha,\omega$-1,2-diol-terminated siloxanes, preferably synthesized from SiH siloxanes
  and glycerolmonoallylether or trimethylolpropanemonoallylether.

In another preferred embodiment, the siloxane-based $\alpha,\omega$-cyclocarbonates leading to $ST^1$ are derived from corresponding SiH siloxanes. They are directly transferred into the cyclocarbonate-terminated structures by addition to olefinically or acetylenically unsaturated cyclocarbonates (U.S. Pat. Nos. 5,672,338, 5,686,547). Glycerolcarbonateallylether is an example for a preferred olefinically unsaturated cyclocarbonate. In turn, this can preferably be obtained from allylglycide ether by $CO_2$ insertion, or from glycerolmonoallyl ether by reaction with phosgene or transesterification with, for example, dimethlycarbonate.

In another preferred embodiment the cyclocarbonates leading to $ST^1$ are derived from dicarboxylic acid ester structures, preferably hydrocarbon-based dicarboxylic acid ester structures. For example, the corresponding dicarboxylic acids or the acid halides are directly esterified with glycerolcarbonate for this purpose. Succinic acid is an example for a suitable dicarboxylic acid.

Moreover, it lies within the scope of the invention to use higher-functional hydrocarbon-based or siloxane-based substances for forming the residue $ST^1$. These materials contain more than two of the cyclocarbonate functions treated above. Examples for higher-functional hydrocarbon-based substances include the cyclocarbonate derivatives of glycerol, pentaerythrol, sorbitol and of their ethoxylates/propoxylates, which in turn preferably derive from the glycidyl derivatives. It also lies within the scope of the invention to transfer higher-functional acid alkoxylates into corresponding glycidyl derivatives and subsequently cyclocarbonate derivatives and use them according to the invention. They are derived, for example, from trimellitic acid or pyromellitic acid.

Higher-functional cyclocarbonate esters are derived from such higher-functional acids, such as trimellitic acid or pyromellitic acid, by reaction with, for example, glycerolcarbonate.

Suitable higher-functional siloxane-based substances with α,ω- and/or comb-like cyclocarbonate substitution are preferably derived from SiH—, epoxy- or 1,2-diol-functionalized materials. As was already described above, they can be transferred into corresponding higher-functional cyclocarbonates by respectively suitable reactions. What is important is that the functionality of these higher-functional hydrocarbon-based or siloxane-based substances is greater than 2.

Moreover, it lies within the scope of the invention to use partially monofunctional hydrocarbon-based or siloxane-based substances for forming the residue $ST^1$. These materials contain a cyclocarbon function as a terminal group.

Examples of monofunctional hydrocarbon-based substances are ethylenecarbonate, propylenecarbonate, glycerolcarbonate, the carbonate ether derivatives of alkanols, for example ethanol, 2-propanol, dodecanol and octadecanol, alkenols, for example allylalcohols, hexenol, oleylalcohol and alkinols, for example propinol and the alkoxylates, especially ethoxylates/propoxylates of the aforementioned monofunetional alcohols. It also lies within the scope of the invention to transfer fatty acid alkoxylates into corresponding carbonate ether derivatives and use them according to the invention.

Moreover, it lies within the scope of the invention to use monofunctional carbonate ester derivatives, starting from saturated and unsaturated carboxylic acids, such as acetic acid, dodecanoic acid, stearic acid, undecenoic acid, oleic acid. As was already explained, they are preferably synthesized by reaction of the acid halides with, for example glycerolcarbonate.

Suitable siloxane-based monofunctional cyclocarbonates are derived from SiH—, epoxy- or 1,2-diol-functionalized materials. As was already described above, they can be transferred into corresponding monofunctional cyclocarbonates by respectively suitable reactions.

Essentially, monofunctional and/or higher-functional $ST^1$ and $ST^2$ or $ST^4$ precursors are used for molecular weight control and, in the case of higher-functional compounds, in order to accomplish a specific deviation from the linear structure predetermined by difunctional $ST^1$ and $ST^2$ or $ST^4$ precursors, and to influence the molecular weight and their degree of branching in a specific manner in the process. Moreover, the use of monofunetional and/or higher-functional $ST^1$ and $ST^2$ or $ST^4$ precursors can serve for shifting the internal ratio $ST^1$:$ST^2$ or $ST^4$ in a specific manner. The combination of, for example, di- and trifunetional $ST^2$ precursors with mono- and difunctional $ST^1$ precursors leads to a molar excess of $ST^1$ segments in relation to $ST^2$ or $ST^4$ segments.

As a result of the complete reaction sequence shown, polycarbonate-polyorganosiloxane and/or polyurethane-polyorganosiloxane-polyammonium compounds are obtained which comprise siloxane units in at least one of the structural elements $ST^1$ and/or $ST^2$, in particular if the quaternating compounds $ST^{4V}(-Q)_t$ are applied. Naturally, the introduction of quaternized nitrogen atoms can also take place after the preparation of a polycarbonate-polyorganosiloxane and/or polyurethane-polyorganosiloxane-polyamino compound and subsequent quaternating reaction with mono- or polyfunctional quaternating agents of the type $ST^{4V}(-Q)_t$, wherein t≤1.

The polycarbonate-polyorganosiloxane and/or polyurethane-polyorganosiloxane compounds according to the invention are in particular also prepared by reacting a compound of the formula (6)

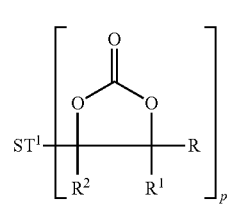

(6)

wherein R, $R^1$, $R^2$ and $ST^1$ are defined as above, and p≥2, and at least one compound of the formula (7)

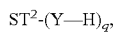

wherein $ST^2$ and Y are defined as above, and wherein q≥2.

In this case, $Y=NR^6$, wherein $R^6$ is as defined above, more preferably hydrogen.

Compounds of the formula (4)

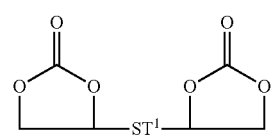

(4)

are used particularly preferably.

The reactions for preparing the polycarbonate-polyorganosiloxane and/or polyurethane-polyorganosiloxane compounds according to the invention are preferably carried out in the range of from room temperature to 160° C., preferably to 140° C. The reaction times are a few minutes to some hours. In this case, the amino-functional precursors are generally more active than the hydroxy-functional precursors.

Reaction times, reaction temperatures and the conversion achieved are particularly dependent on the type of the amino groups on the HY precursors. It generally applies that primary amino groups react more easily than secondary amino groups. Reaction times, reaction temperatures and the conversion achieved moreover are particularly dependent on the type of the quaternization-capable or alkylation-capable group Q on $ST^4$. It generally applies that, for example, halocarboxylic acid ester groups react more easily than comparable haloalkyl groups.

It lies within the scope of the invention to carry out the entire reaction sequence or individual partial steps without any solvents or, however, in the presence of solvents. Preferred solvents are typical lacquer solvents, such as methoxypropylacetate, butyl acetate, toluene. The reaction in protic solvents, such as alcohols, for example ethanol, 2-propanol, 1-butanol, 2-butanol, 1-methoxy-2-propanol or higher ethyleneoxide- or propyleneoxide derivatives may also be advantageous.

As a result of the total reaction sequence shown using the quaternating reagents, polycarbonate-polyorganosiloxane and/or polyurethan-polyorganosiloxane compounds with amino and or ammonium groups are obtained which comprise polysiloxane units in at least one of the structural elements $ST^1$ or $ST^2$.

The invention further relates to the use of the polycarbonate-polyorganosiloxane and/or polyurethane-polyorganosiloxane compounds according to the invention for the production of coatings, agents for surface modification, elastomers, duromers, adhesives, primers for metal or plastic surfaces, polymer additives, laundry detergent additives, rheological agents, cosmetic agents, fiber modification agents.

In cosmetic formulations for hair, the polycarbonate-polyorganosiloxane and/or polyurethane-polyorganosiloxane compounds according to the invention can, in particular, fulfill the function of so-called conditioners, i.e. have, in particular, a favorable effect on the property of hair, such as softness, gloss, volume, ease of combing etc., wherein they may also be used, in particular, in combination with other common conditioners, such as, for example, poly-alpha-olefins, fluorinated oils, fluorinatedwaxes, fluorinated rubbers, carboxylic acid esters with at least 10 carbon atoms, cationic polymers, silicones insoluble or soluble in the medium of the formulation, mineral oils, plant oils and animal oils and mixtures thereof, as described, for example, in WO 99/009939.

The invention further relates to the use of the polycarbonate-polyorganosiloxane and/or polyurethane-polyorganosiloxane compounds according to the invention for the production of coatings or agents for surface modification of hard surfaces, such as, for example, glass, ceramics, tiles, concrete and steel parts, such as automobile bodies and ship's hulls.

Moreover, the invention preferably relates to the use of the polycarbonate-polyorganosiloxane and/or polyurethane-polyorganosiloxane compounds according to the invention for the production of primers for bonding silicone elastomers to other substrates, such as steel, aluminum, glass, plastics, such as epoxy resins, polyamides, polyphenylene sulfides, polyesters, such as polyterephthalates.

In a further preferred embodiment of the invention, this relates to the use of the polycarbonate-polyorganosiloxane and/or polyurethane-polyorganosiloxane compounds according to the invention for the production of modification agents for thermoplastic synthetic materials, such as polyolefines, polyamides, polyurethanes, poly(meth)acrylates, polycarbonates.

In a further preferred embodiment of the invention, this relates to the use of the polycarbonate-polyorganosiloxane and/or polyurethane-polyorganosiloxane compounds according to the invention for the production of low-temperature impact-resistance modifiers.

The term "for the production of" as it is used above also includes the case that the polycarbonate-polyorganosiloxane and/or polyurethane-polyorganosiloxane compound is used only for the specified application. This means that the polycarbonate-polyorganosiloxane and/or polyurethane-polyorganosiloxane compounds themselves can be used directly as low-temperature impact-resistance modifiers. However, they can also be suitably provided in advance, for example by mixing, compounding, master batch production.

Moreover, the polycarbonate-polyorganosiloxane and/or polyurethane-polyorganosiloxane compounds can preferably be used as a constituent in adhesives and sealants, as the basic material for thermoplastic elastomers, such as cable sheathings (cable coatings), tubes, gaskets, keyboard mats, for membranes, such as selectively gas-permeable membranes. Another use of the copolymers according to the invention are coatings, such as anti-fouling, anti-stick coatings, tissue-compatible coatings, flame-retardant coatings and bio-compatible materials.

They can serve as coating agents for cosmetics, body care products, paint additives, auxiliary substances in detergents, de-foaming formulations and textile processing, for modifying resins or modifying bitumen.

Other uses include packaging material for electronic components, insulation or shielding materials, sealing material in cavities with formation of condensation water, such as air planes, ships, automobiles, additives for cleaning agents, detergents or care products, as an additive for body care products, as coating material for wood, paper and cardboard, as mold-release agent, as a bio-compatible material in medical applications such as contact lenses, as coating material for textile fibers or textile fabrics, as coating material for natural fabrics such as, for example, leather or furs, as material for membranes and as a material for photoactive systems, e.g. for lithographic processes, optical data recording or optical data transmission.

In a further preferred embodiment of the invention, this relates to the use of the polycarbonate-polyorganosiloxane and/or polyurethane-polyorganosiloxane compounds according to the invention for the production of viscosity regulators, anti-static agents, mixture components for silicone rubbers that can be cross-linked peroxidically or by hydrosilylation (platinum catalysis) to form elastomers, and there lead to the modification of surface properties, for the modification of the diffusion of gases, liquids, etc, or modify the swelling behavior of the silicone elastomers, of softeners for textile fibers for the treatment of textile fibers prior to, during and after washing, of agents for modifying natural and synthetic fibers, such as hair, cotton fibers and synthetic fibers, such as polyester fibers and polyamide fibers, as well as union fabric, of textile finishing agents, as well as of detergent-containing formulations, such as laundry detergents and cleaning products.

The present invention further relates to novel laundry detergent formulations, cosmetic formulations, fiber treatment formulations containing the polycarbonate-polyorganosiloxane and/or polyurethane-polyorgariosiloxane compounds according to the invention.

Thus, the polycarbonate-polyorganosiloxane and/or polyurethane-polyorganosiloxane compounds according to the invention can be present, for example, in solid or liquid laundry detergent formulations in contents of approximately 0.1 to 10% by wt., relative to the total amount of the formulation, in cosmetic formulations and formulations for fiber treatment, such as textile care products, in contents of approximately 0.1 to 50% by wt. relative to the total amount of the formulation.

Preferably, the polycarbonate-polyorganosiloxane and/or polyurethane-polyorganosiloxane compounds according to the invention can be used in the treatment and finishing of hard surfaces, such as glass, ceramics, tiles, plastic surfaces, metal surfaces, lacquer surfaces, especially ship's hulls and automobile bodies, in particular also in drying agent formulations for automatic car washing, as an adhesive or primer, preferably for the bonding of silicone elastomers to other substances, such as steel, aluminum, glass, epoxy resins, polyamide, as modifiers, e.g. low-temperature impact-resistance modifiers and polarity modifiers, for hydrocarbon-based polymers and silicone-based elastomer systems based on peroxidic and Pt-catalyzed cross-linking.

Moreover, they can be used for the treatment of natural and synthetic fibers, such as cotton, wool, polyester- and polyamide-based synthetic fibers, especially in the form of textiles, in specific agents for fiber treatment, in particular in laundry detergent formulations containing anionic, non-ionic and cationic surfactants, wherein the compounds according to the invention can be directly incorporated into the laundry detergent, can be added in a dosed manner separately to the running washing process or subsequent to the washing process, and wherein the treated substrates are given softness, improved elasticity and a decreased tendency to crease while receiving acceptable hydrophilicity.

They can also serve as a constituent of separate softening systems, especially on the basis of cationic surfactants, after washing fibers and textiles, as an ironing aid and agent for preventing or reversing textile creasing.

They can further be used for finishing fibers, especially for the first finishing and treatment of, for example, cotton, wool, polyester- and polyamide-based synthetic fibers, especially in the form of textiles, paper and wood.

Moreover, as was already mentioned, they can be used advantageously in cosmetic systems for the treatment of hair and skin.

Particularly preferred application areas of the polycarbonate-polyorganosiloxane and/or polyurethane-polyorganosiloxane compounds according to the invention are also, preferably aqueous, solutions, mixtures, emulsions and micro-emulsions, in particular as basis for cosmetic formulations.

The polycarbonate-polyorganosiloxane and/or polyurethane-polyorgano siloxane compounds according to the invention can be used as a pure substance, solution, mixture, emulsion or micro-emulsion, in the form of liquids, creams or pastes as feedstock for the production of suitable cosmetic formulations according to the invention having different viscosities.

The method for producing formulations of the polycarbonate-polyorganosiloxane and/or polyurethane-polyorganosiloxane compounds according to the invention, such as, for example, for treating substrates, such as hard and soft substrates, can, for example, include the following steps:

a) Producing a pre-mixture in the form of solutions, mixtures or emulsions with the polycarbonate-polyorganosiloxane and/or polyurethane-polyorganosiloxane compounds according to the invention, and b) Producing another mixture using the pre-mixture a) as well as adding of, optionally, further surfactants, auxiliary substances and other additives, or c) Combining the steps a) and b) by mixing the constituents with stirrers, dissolvers, kneaders, pumps, mixing screws, mixing nozzles, low- and high-pressure emulsifying devices.

The processes are realized using the machines and apparatuses known in the art (Ullmann's Enzyklopädie), such as, for example, any form of stirrers in suitable containers, apparatuses or mixing devices, as described above.

Direct mixing of all constituents is possible. However, the preparation of a pre-mixture is preferred since it leads to a faster and better distribution and is, in part, indispensable because the various substance groups can otherwise not be mixed with each other or emulsified or dispersed, or only with considerable effort. Suitable pre- or intermediate mixtures can preferably be mixtures in the form of solutions, pastes, creams or other forms of emulsions or dispersions. Particularly preferred is the production and use of micro-emulsions with 10 to 200 nm mean particle diameter in cosmetic formulations.

The formulations containing the polycarbonate-polyorganosiloxane and/or polyurethane-polyorganosiloxane compounds according to the invention can, for example, be produced as different form of administration, such as for hair treatment. Preferably, the compositions containing the polycarbonate-polyorganosiloxane and/or polyurethane-polyorganosiloxane compounds according to the invention are used as cosmetic formulations for the treatment of keratin-containing substrates, such as, for example, human and animal hair or skin, as alcoholic or polyalcoholic solution or as emulsion. Depending on the raw materials, auxiliary substances and the mixing method used during the production, clear, opaque and white formulations are obtained.

For preparing solutions and mixtures containing the polycarbonate-polyorganosiloxane and/or polyurethane-polyorganosiloxane compounds according to the invention, alcoholic and polyalcoholic solvents as well as their mixtures with water, oil-containing and common silicones (inter alia polydimethylsiloxane) as well as binary and ternary mixtures of solvents and/or oil-containing substances and/or silicones are preferably suitable. In this case, particularly preferred solvents are ethanol, isopropanol, ethylene glycol and ethylene glycol ether, polyethylene glycols and their ethers, propylene glycol and propylene glycol ethers, polypropylene glycol and their ethers and glycerin and mixtures thereof. Particularly preferred oil-containing substances include mineral oil products as well as oils of plant, animal and synthetic origin and mixtures thereof. Particularly preferred silicones different from the polycarbonate-polyorganosiloxane and/or polyurethane-polyorganosiloxane compounds according to the invention, such as cyclic and linear polydimethylsiloxanes and mixtures thereof, such as, for example, (according to INCI) cyclomethicones, cyclotetrasiloxanes, cyclopentasiloxanes, cyclohexasiloxanes, dimethicones with a viscosity range of 0.65 to 60,000,000 mPa·s at 25° C. and dimethiconol with a viscosity range of 10 to 60,000,000 mPa·s at 25° C., Preferred solutions and mixtures containing the polycarbonate-polyorganosiloxane and/or polyurethane-polyorganosiloxane compounds according to the invention have the following composition in % by wt., relative to the total weight of the composition:

Solutions or Mixtures:

| | |
|---|---|
| 0.1-99.9% | polycarbonate-polyorganosiloxane and/or polyurethane-polyorganosiloxane compounds according to the invention |
| 0.1-99.9% | solvents and/or oil and/or silicones, and/or water |

Compositions of the emulsions of the polycarbonate-polyorganosiloxane and/or polyurethane-polyorganosiloxane compounds according to the invention:

For preparing the emulsions, water and non-ionic, cationic and amphoteric surfactants and surfactant mixtures are generally used. Furthermore, emulsions may contain auxiliary substances, such as, for example, inorganic and organic acids, bases and buffers, salts, thickening agents, stabilizers for emulsions, such as, for example, "xanthan gum", preserving agents, foam stabilizers, de-foaming agents and solvents, such as, for example, alcohols (ethanol, isopropanol, ethylene glycol, polyethylene glycol, propylene glycol, polypropylene glycol, glycol ether and glycerin and mixtures thereof).

The polycarbonate-polyorganosiloxane and/or polyurethane-polyorganosiloxane compounds according to the invention used in the emulsions may themselves also serves as emulsifiers in the preparation of emulsions.

A preferred emulsion that can preferably be used for the production of cosmetic formulations, consists, for example, of the following constituents in % by wt., relative to the total amount of the composition:

| | |
|---|---|
| 10-50% | polycarbonate-polyorganosiloxane- and/or polyurethane-polyorganosiloxane compounds according to the invention, |
| 1-35% | surfactants, |
| 0-10% | auxiliary substances, |
| 0-20% | solvents, |
| to 100% | supplemented with water. |

Micro-emulsions for cosmetic formulations, the finishing of textiles and other fiber-like substrates, or the coating of hard surfaces:

The preparation of micro-emulsions with a high active content of polycarbonate-polyorganosiloxane and/or polyurethane-polyorganosiloxane compounds according to the invention is particular preferred, since they, in addition to the possibility of preparing clear cosmetic formulations, offer the additional advantage of being simple, with regard to the process, to work into ("cold process") aqueous formulations. There is the possibility of using the polycarbonate-polyorganosiloxane and/or polyurethane-polyorganosiloxane compounds according to the invention in the preparation of micro-emulsions in the form of the above described solutions and mixtures. A preferred active content of the polycarbonate-polyorganosiloxane and/or polyurethane-polyorganosiloxane compounds according to the invention in the emulsion is between 5 and 60% by wt., particularly preferably 10-50% by wt., relative to the total amount of the composition.

An especially preferred micro-emulsion consists of the following constituents, which, however, do not limit the invention, in % by wt. relative to the total amount of the micro-emulsion.

| | |
|---|---|
| 20-80% | Polycarbonate-polyorganosiloxane and/or polyurethane-polyorganosiloxane compounds according to the invention |
| 0-35% | Surfactants |
| 0-10% | Auxiliary substances |
| 0-20% | Solvents |
| to 100% | supplemented with water. |

Another subject matter of the invention is the use of the solutions, mixtures or emulsions prepared with the polycarbonate-polyorganosiloxane and/or polyurethane-polyorganosiloxane compounds according to the invention in a cosmetic formulation.

These cosmetic formulations are prepared using the previously prepared solutions or emulsions, however, they can also be prepared directly from the individual constituents.

Cosmetic Formulations:

Cosmetic formulations include, for example:

So-called "rinse-off" products, such as, for example, "2-in-1" shampoos, "body wash" and hair conditioner for treating hair during and after washing or after dyeing or the treatment of hair prior to bleaching, curling or uncurling, as well as so-called "leave-in" products, such as hair tonics, care creams, styling creams, hair gels, hair styling products, hair setting products, hair sprays, pump sprays, blow-waving compositions and blow-drying setting compositions. The formulations moreover also include hair dyes, which can be differentiated into 3 types according to the resistance of the color result achieved to washing—permanent, semipermanent and temporary hair dyes. The term hair in this case includes all keratin-containing fibres, but in particular human hair. The hair dyes contain, for example, conventional silicones, surfactants, auxiliary substances and dyes, in addition to the polycarbonate-polyorganosiloxane and/or polyurethane-polyorganosiloxane compounds according to the invention. Each of these ingredients can be used either by itself or in combination with further ingredients, and represents additional functions in the formulations which serve to increase the volume, the ease of combing and the gloss and to reduce washing out of the color from and out of dyed keratin-containing substrates, such as, for example human and animal hair, and contain at least one polyurethane and polyester-polysiloxane compound according to the invention.

The abbreviations mentioned in connection with the cosmetic formulations are explained in the INCI (The Cosmetic, Toiletry and Fragrance Association, Washington D.C.).

The silicones included here in addition to the polycarbonate-polyorganosiloxane and/or polyurethane-polyorganosiloxane compounds according to the invention include, for example:

Cyclic, linear and branched polydimethylsiloxanes having a viscosity of 0.65-200,000,000 mPas at 25° C. and mixtures thereof, such as e.g. octaorganocyclotetrasiloxanes, octamethylcyclotetrasiloxanes, decaorganocyclo-pentasiloxanes and dodecaorganocyclohexasiloxanes, wherein the organic residue preferably denotes methyl, such as SF 1173, SF 1202, SF 1217, SF 1204 and SF 1258 from GE Bayer Silicones, dimethicones, such as the Baysilone M oils (M3 to M 2,000, 000), SE 30, SF 1214, SF 1236, SF 1276 and CF 1251 from Momentive Performance Materials, and dimethiconols, such as Baysilone abhesive ZWTR/OH, i.e. SiOH-terminated polydimethylsiloxanes 2-20 kPa·s from Momentive Performance Materials and DC 1501 and DC 1503 from Dow Corning.

The use of the polydimethylsiloxanes described above in the form of non-ionic, anionic and cationic emulsions, such as e.g. SM 2169, SM 2785, SM 555, SM 2167 and SM 2112 from Momentive Performance Materials, in combination with emulsions of the polycarbonate-polyorganosiloxane and/or polyurethane-polyorganosiloxane compounds according to the invention and/or the use of mixtures and solutions of the polydimethylsiloxanes described above with the polycarbonate-polyorganosiloxane and/or polyurethane-polyorganosiloxane compounds according to the invention is particularly preferred in this case, since particular properties of hair care products can be derived from these combinations, such as has already been described extensively in the literature for amino-functional silicones known to date (WO 99/44565, WO 99/44567, WO 99/49836, WO 99/53889, WO 97/12594, U.S. Pat. No. 6,028,031, EP 0811371, WO 98/18443, WO 98/43599 and US 2002-0182161).

Solid silicones, so-called MQ resins, such as e.g. SR 1000 from Momentive Performance Materials, and solutions thereof in solvents, such as the above-mentioned silicones and aliphatic solvents, such as e.g. isododecane, are also suitable. Organofunctional silicones, such as alkyl-, aryl-, arylalkyl-, phenyl-, fluoroalkyl- and polyether-modified silicones, such as the types SF 1632, SF 1642, SF 1555, Baysilone CF 1301, Baysilone PK 20, FF 157, SF 1188A, SF 1288 and SF 1388 from Momentive Performance Materials, are also suitable.

Surfactants:

Surfactants as ingredients of cosmetic formulations are described in A. Domsch: Die kosmetischen Präparate, Verlag für Chem. Industrie, 4th edition, 1992, in Kosmetikjahrbuch 1995, Verlag für chemische Industrie, 1995, and H. Stache, Tensidtaschenbuch, 2nd edition, Carl Hanser Verlag, 1981.

Anionic Surfactants:

By way of example but without being limited thereto, the following anionic surfactants are suitable as a constituent of the formulations:

Alkyl sulfates, alkyl ether sulfates, alkaryl sulfates, olefinsulfonates, alkylamide ether sulfates, acyl isethionates, acyl glutamates, alkyl ether carboxylates, methyl taurides and taurides, sarcosides, sulfosuccinates, protein-fatty acid condensates, alkyl phosphates and alkyl ether phosphates. The free acids and alkali metal salts and magnesium, ammonium and mono-, di- and triethanolamine salts thereof can be used in this case.

The alkyl and acyl groups typically contain 8-18 C atoms and can be unsaturated. The alkyl ether sulfates, alkylamide ether sulfates, alkyl ether carboxylates and alkyl ether phosphates can contain 1-10 ethylene oxide or propylene oxide units or a combination of ethylene oxide and propylene oxide units.

Amphoteric Surfactants:

By way of example but without being limited thereto, the following amphoteric surfactants are suitable as a constituent of the formulations:

Alkylbetaines, alkylamidobetaines, sulfobetaines, acetates and diacetates, imidazolines, propionates and alkylamine oxides.

The alkyl and acyl groups in this case contain 8-19 C atoms.

Non-Ionic Surfactants:

By way of example but without being limited thereto, the following non-ionic surfactants are suitable as a constituent of the formulations:

Alkyl ethoxylates, aryl ethoxylates, ethoxylated esters, polyglycolamides, polysorbates, glycerol-fatty acid ethoxylates, alkylphenol polyglycol ethers and sugar surfactants, such as e.g. alkyl glycosides.

Cationic Surfactants:

In the case of cationic surfactants, a distinction is made between pure cationic surfactants and cationic polymers.

Pure Cationic Surfactants:

By way of example but without being limited thereto, the following non-ionic surfactants are suitable as a constituent of the formulations:

Monoalkylquats, dialkylquats, trialkylquats, tetraalkylquats, benzylammonium salts, pyridine salts, alkanolammonium salts, imidazoline salts, oxazoline salts, thiazoline salts, salts of amine oxides and sulfone salts, wherein the term "quat" implies the presence at least of one quaternary ammonium group.

Cationic Polymers:

For "2-in-1" shampoos in particular, cationically modified polymers are also used in addition to the pure cationic surfactants. A comprehensive description of these polymers is given in U.S. Pat. No. 5,977,038 and WO 01-41720 A1. Cationic polyacrylamides, cationic protein derivatives, hydroxyalkylcellulose ethers and cationic guar derivatives are preferred in this case. Cationic guar derivatives with the CTFA name guar hydroxypropyltrimonium chloride are particularly preferred. These types are available under the trade names Cosmedia Guar C 261 (Henkel), Diagum P 5070 (Diamalt) and Jaguar C types and Jaguar EXCEL from Rhodia.

Auxiliary Substances:

Auxiliary substances as ingredients in particular of cosmetic formulations are described in: A. Domsch, Die kosmetischen Präparate, Verlag far Chem. Industrie, 4th edition, 1992; and in: Kosmetikjahrbuch 1995, Verlag für Chemische Industrie, 1995.

By way of example but without being limited thereto, the following auxiliary substances are suitable as a constituent of the formulations:

Inorganic and organic acids, bases and buffers, salts, alcohols, such as e.g. ethanol, isopropanol, ethylene glycol, polyethylene glycol, propylene glycol, polypropylene glycol, glycol ethers and glycerol, thickeners, stabilizers for emulsions, such as e.g. xanthan gum, re-oiling agents, preservatives, foam stabilizers, defoamers, pearlescent and opacifying agents, such as e.g. glycol distearates and titanium dioxide, collagen hydrolysate, keratin hydrolysate, silk hydrolysate, antidandruff active compounds, such as e.g. zinc pyrithione, salicylic acid, selenium disulfide, sulfur and tar preparations, polymeric emulsifiers, vitamins, dyestuffs, UV filters, bentonites, perfume oils, fragrances, styling polymers, moisturizers, plant extracts and further natural or nature-identical raw materials.

It is known that by the addition of oil- and water-soluble UV filters (sunscreen compositions) or combinations of UV filters in cosmetic formulations for care and treatment of keratin-containing substrates, such as human and animal hair, the degradation of dyestuffs and therefore the bleaching out and fading of colored keratin-containing substrates by UV radiation can be reduced decisively or even prevented completely.

Ingredients for Hair Dyes:

Dyestuffs and other ingredients of hair dyes are described in; A. Domsch, Die kosmetischen Präparate, Verlag für chem. Industrie, 4th edition, 1992. Dyestuffs are described in: Ordinance on cosmetic agents (Cosmetics Ordinance), Bundesgesetzblatt 1997, part I p. 2412, .sctn.3 and annex 3 and in European Community (EC) Directive, 76/68/EEC, annex IV.

In the following, hair dyes are differentiated into permanent, semipermanent and temporary hair dyes.

Permanent Hair Dyes:

Permanent colorings which are not washed out even by washing the hair several times (more than 10) are formed by chemical reaction between dyestuff precursors under oxidative conditions by hydrogen peroxide. The mixture of the corresponding components determines the color result which can be achieved in this case.

In the case of the precursors, a distinction is made between oxidation bases (developers) and coupling components (modifiers).

Oxidation Bases:

By way of example but without being limited thereto, the following oxidation bases are suitable as a constituent of the formulations:

m- and p-phenylenediamines (diaminobenzenes), N-substituted derivatives and salts thereof, N-substituted derivatives of o-phenylenediamine, o-, m- and p-toluoylenediamines (methyl-diaminobenzenes), N-substituted derivatives and salts thereof, p-amino-diphenylamine and its hydrochloride and sulfate, o-, m- and p-aminophenol and its hydrochloride, 2,4-diaminoisosulfate (4-methoxy-m-phenylenediamine sulfate), o-chloro-p-phenylenediamine sulfate, picramic acid (2,4-dinitro-6-aminophenol) and 2,4-dinitro-1-naphtholsulfonic acid and the sodium salt thereof.

Coupling Components:

By way of example but without being limited thereto, the following coupling components are suitable as a constituent of the formulations:

Hydroquinone (1,4-dihydroxybenzene), resorcinol (1,3-dihydroxybenzene), pyrocatechol (1,2-dihydroxybenzene), α-naphthol (1-hydroxynaphthalene), pyrogallol (1,2,3-trihydroxybenzene) and 2,6-diaminopyridine.

Oxidation bases and coupling components are conventionally incorporated with surfactants into oil-in-water emulsions, but simple solutions or shampoos are also known as formulations. The formulations moreover contain antioxidants, such as e.g. sodium sulfite, sodium dithionite, ascorbic acid or thioglycolic acid, to stabilize the precursors and are adjusted to a pH-value of between 8 and 12 (preferably 9-11) with alkaline substances, such as e.g. ammonia. Surfactants as wetting agents, complexing agents for heavy metals, fragrances for masking the ammonia smell, conditioners for improving the feel of the hair and for protecting the hair and solvents, such as ethanol, ethylene glycol, glycerol or benzyl alcohol, are moreover added.

Permanent hair dyes are typically on offer as 2-component systems comprising the color solution, cream or shampoo described above and the developer solution. The developer solution in this case contains between 6-12% of hydrogen peroxide, and constituents of the formulation containing the color components can optionally also be added. The peroxide solution, however, must be thoroughly stabilized in this case.

Semipermanent Hair Dyes:

Semipermanent colorings have been developed to maintain the coloring for 6-10 washes with shampoo. So-called direct dyestuffs which essentially belong to the group of nitro, azo and anthraquinone dyestuffs are used in this case. These dyestuffs are small enough to penetrate into the hair. Formulations which are typically employed are solutions, creams, shampoos or also aerosol foams. The composition is comparable to the formulations containing the color component which are as permanent hair colorings.

Temporary Hair Dyes:

In contrast to the semipermanent hair dyes, temporary colorings, also called tints, contain larger dyestuff molecules which are not capable of penetrating into the hair. They have been developed to maintain the coloring for washes. Azo and basic dyestuffs and azine and thiazine derivatives are typically employed in this case. The statements regarding the semipermanent and permanent hair dyes apply to the composition of the formulations. Dyestuffs and other ingredients of hair dyes are described in: A. Domsch, Die kosmetischen Präparate, Verlag für chem. Industrie, 4th edition, 1992. Dyestuffs are described in: Ordinance on cosmetic agents (Cosmetics Ordinance), Bundesgesetzblatt 1997, part I p. 2412, .sctn.3 and annex 3 and in European Community (EC) Directive, 76/68/EEC, annex IV.

The following recipes, which do not, however, limit the invention, in which each functional active compound can occur as an individual compound or as a mixture of several compounds of this category have been found to be particularly advantageous for the use of the mixtures containing the polycarbonate-polyorganosiloxane and/or polyurethane-polyorganosiloxane compounds according to the invention in cosmetic formulations.

A typical shampoo formulation according to the invention, which does not, however, limit the invention, for care and conditioning of hair comprises the following constituents in % by wt., in each case relative to the total formulation:

| | |
|---|---|
| 0.01-10% | Polycarbonate-polyorganosiloxane and/or polyurethane-polyorganosiloxane compounds according to the invention |
| 2-15% | Anionic surfactant |
| 0-10% | Amphoteric surfactant |
| 0-15% | Non-ionic surfactant |
| 0-10% | Cationic surfactant |
| 0-10% | Silicone-conditioners (co-adjuvants) |
| 0-10% | Auxiliary substances |
| to 100% | supplemented by water. |

A specific shampoo formulation, which does not, however, limit the invention, comprises the following constituents in % by wt.:

| | |
|---|---|
| 0.1-12% | Polycarbonate-polyorganosiloxane and/or polyurethane-polyorganosiloxane compounds according to the invention |
| 1-35% | sodium or ammonium lauryl or laureth sulfate (20-30%) |
| 1-6% | Cocoamidopropylbetaine (25-35%) |
| 0-3% | Guar Hydroxypropyltrimonium Chloride |
| 0-5% | Polyquaternium-10 |
| 0-12% | Silicone-conditioners (co-adjuvants) |
| 0.01-1% | Disodium EDTA |
| 0.01-1% | Phenoxyethynol (and) methylparaben (and) butylparaben (and) ethylparaben (and) propylparaben |
| 0-1% | Perfume (fragrance) |
| 0-1% | Dyestuffs |
| 0-1% | Citric acid |
| 0-2% | Sodium chloride |
| to 100% | supplemented with water. |

A typical hair conditioner according to the invention, which does not, however, limit the invention, for care and conditioning of hair comprises the following constituents in % by wt.:

| | |
|---|---|
| 0.1-15% | Polycarbonate-polyorganosiloxane and/or polyurethane-polyorganosiloxane compounds according to the invention |
| 0-10% | Amphoteric surfactant |
| 0.1-15% | Non-ionic surfactant |
| 0-10% | Cationic surfactant |
| 0-15% | Silicone-conditioners (co-adjuvants) |
| 0-20% | Auxiliary substances |
| to 100% | supplemented with water. |

A specific composition of a hair conditioner, which does not, however, limit the invention, comprises the following constituents in % by wt.:

| | |
|---|---|
| 0.5-15% | polycarbonate-polyorganosiloxane and/or polyurethane-polyorganosiloxane compounds according to the invention (as a 43.5% emulsion in water with non-ionic emulsifiers) |
| 0-15% | Silicone-conditioners (co-adjuvants) |
| 0-10% | Cetrimonium chloride (25-35%) |
| 0-3% | Guar Hydroxypropyltrimonium Chloride |
| 1-10% | Cetearyl alcohol |
| 0-10% | Glycerin |
| 0.01-1% | Phenoxyethynol (and) methylparaben (and) butylparaben (and) ethylparaben (and) propylparaben |
| 0-1% | Perfume (fragrance) |
| 0-1% | Dyestuffs |
| 0-1% | Citric acid |
| to 100% | supplemented with water. |

A typical hair care treatment according to the invention, which does not, however, limit the invention, for care and conditioning of hair comprises the following constituents in % by wt.:

| | |
|---|---|
| 0.4-20% | Polycarbonate-polyorganosiloxane and/or polyurethane-polyorganosiloxane compounds according to the invention |
| 0-15% | Non-ionic surfactant |
| 0-10% | Cationic surfactant |

| | |
|---|---|
| 0-20% | Silicone-conditioners (co-adjuvants) |
| 0-20% | Auxiliary substances |
| to 100% | supplemented with water. |

A specific hair care treatment, which does not, however, limit the invention, comprises the following constituents in % by wt.:

| | |
|---|---|
| 1-20% | polycarbonate-polyorganosiloxane and/or polyurethane-polyorganosiloxane compounds according to the invention (as a 43.5% emulsion in water with non-ionic emulsifiers) |
| 0.5-10% | Steareth alcohol (and) Steareth-7 (and) Steareth-10 |
| 0-20% | Silicone-conditioners (co-adjuvants) |
| 0-10% | Cetrimonium chloride (25-35%) |
| 0-3% | Guar Hydroxypropyltrimonium Chloride |
| 0-5% | Dimethicones |
| 0-5% | Paraffin oil |
| 1-10% | Stearyl alcohol |
| 0-10% | Glycerin |
| 0.01-1% | Phenoxyethynol (and) methylparaben (and) butylparaben (and) ethylparaben (and) propylparaben |
| 0-1% | Perfume (fragrance) |
| 0-1% | Dyestuffs |
| 0-1% | Citric acid |
| 0-2% | Sodium chloride |
| to 100% | supplemented with water. |

A quite specific hair care treatment, which does not, however, limit the invention, comprises the following constituents in % by wt.:

| | |
|---|---|
| 2-5% | polycarbonate-polyorganosiloxane and/or polyurethane-polyorganosiloxane compounds according to the invention (as a 43.5% emulsion in water with non-ionic emulsifiers) |
| 0-5% | Silicone-conditioners (co-adjuvants) |
| 0-2% | Cetrimonium chloride (25-35%) |
| 0.5-5% | Glycerin |
| 0.25-2.5% | Propylene glycol |
| 0.05-0.2% | Perfume |
| 0.1-0.5% | Polysorbate 20 |
| to 100% | supplemented with water. |

A typical dyestuffs-containing formulation according to the invention, which does not, however, limit the invention, for temporary, semipermanent or permanent hair coloring, care and conditioning of hair comprises the following constituents in % by wt.:

| | |
|---|---|
| 0.1-10% | Polycarbonate-polyorganosiloxane and/or polyurethane-polyorganosiloxane compounds according to the invention |
| 1-10% | Hair dyestuff precursors or dyestuffs, depending on desired hair color |
| 0-15% | Anionic surfactant |
| 0-10% | Amphoteric surfactant |
| 0-10% | Non-ionic surfactant |
| 0-10% | Cationic surfactant |
| 0-1% | Sodium sulfite |
| 0-5% | Buffer |
| 0-10% | Silicone-conditioners (co-adjuvants) |
| 0-10% | Auxiliary substances |
| to 100% | Water. |

A specific color cream according to the invention, which does not, however, limit the invention, for permanent hair coloring comprises the following constituents in % by wt.:

| | |
|---|---|
| 0.1-10% | polycarbonate-polyorganosiloxane and/or polyurethane-polyorganosiloxane compounds according to the invention (as a 20% emulsion in water with non-ionic emulsifiers) |
| 1-5% | Hair dyestuff precursors or dyestuffs, depending on desired hair color |
| 2-15% | Anionic surfactant |
| 0-10% | Amphoteric surfactant |
| 0-10% | Non-ionic surfactant |
| 0-10% | Cationic surfactant |
| 0.1-1% | Sodium sulfite |
| 0.1-5% | Buffer for pH = 8-12 |
| 0-10% | Silicone-conditioners (co-adjuvants) |
| 0-10% | Auxiliary substances |
| to 100% | Water. |

A specific color solution according to the invention, which does not, however, limit the invention, for permanent hair coloring comprises the following constituents in % by wt.:

| | |
|---|---|
| 0.1-10% | polycarbonate-polyorganosiloxane and/or polyurethane-polyorganosiloxane compounds according to the invention (as a 20% emulsion in water with non-ionic emulsifiers) |
| 1-5% | Hair dyestuff precursors or dyestuffs, depending on desired hair color |
| 0.1-1% | Sodium sulfite |
| 5-15% | Propylene glycol |
| 5-15% | Ammonia (28%) |
| 10-30% | Oleic acid |
| 5-15% | Isopropanol |
| 10-30% | Alkanolamide |
| 0-10% | Silicone-conditioners (co-adjuvants) |
| to 100% | Water. |

A typical developer formulation according to the invention, which does not, however, limit the invention, for permanent hair coloring comprises the following constituents in % by wt.:

| | |
|---|---|
| 0.1-10% | Polycarbonate-polyorganosiloxane and/or polyurethane-polyorganosiloxane compounds according to the invention |
| 10-30% | Hydrogen peroxide (30%) |
| 0-15% | Anionic surfactant |
| 0-10% | Amphoteric surfactant |
| 0-10% | Non-ionic surfactant |
| 0-10% | Cationic surfactant |
| 0-5% | Buffer or acid for pH = 2-6 |
| 0-10% | Silicone-conditioners (co-adjuvants) |
| 0-10% | Auxiliary substances |
| to 100% | Water. |

A specific developer cream according to the invention, which does not, however, limit the invention, for permanent hair coloring comprises the following constituents in % by wt.:

| | |
|---|---|
| 0.1-5% | polycarbonate-polyorganosiloxane and/or polyurethane-polyorganosiloxane compounds according to the invention (as a 20% emulsion in water with non-ionic emulsifiers) |
| 10-30% | Hydrogen peroxide (30%) |
| 0-5% | Silicone-conditioners (co-adjuvants) |
| 1-10% | Cetearyl alcohol |
| 0.5-5% | Trideceth-2 carboxamide MEA |
| 0.5-5% | Ceteareth-30 |
| 0.5-5% | Glycerin |
| 0.05-2% | Pentasodium pentetate (pentasodium diethylenetriaminepentaacetate |

| | |
|---|---|
| 0.05-2% | sodium stannate |
| 0.05-2% | Tetrasodiumpyro phosphate |
| to 100% | Water. |

It has been found in this case that the solutions or mixtures according to the invention are preferably suitable for the preparation of cosmetic formulations, such as for the treatment, conditioning, cleansing and/or care of colored substrates or substrates which are to be colored.

That is to say, the formulations containing at least one polycarbonate-polyorganosiloxane and/or polyurethane-polyorganosiloxane compound invention can be employed in particular for cleansing, care and conditioning of fibrous or flat substrates, and if these are colored and the color impression thereof is to be largely retained.

The formulations containing at least one polycarbonate-polyorganosiloxane and/or polyurethane-polyorganosiloxane compound according to the invention can furthermore serve for the cleansing, care and the treatment and the conditioning of keratin-containing substrates, since they are suitable as cleansing compositions for wool, for washing and/or increasing the volume and/or the ease of combing and/or the gloss and/or for reducing the washing out of the color from and out of colored keratin-containing substrates or from keratin-containing substrates which are simultaneously to be colored, such as e.g. human and animal hair.

The formulations containing at least one polycarbonate-polyorganosiloxane and/or polyurethane-polyorganosiloxane compound according to the invention can furthermore be used in particular for the cleansing, care and the treatment, cleansing and care of keratin-containing fibres or hair before, during and/or after the coloring operation, since the hair dyes formulated therewith lead simultaneously to an improvement in the softness and/or to a reduction in the wet and dry combing forces and/or to an increase in the gloss and/or to an increase in the hair volume and/or to a reduction in the washing out of dyestuffs from and out of tinted and dyed hair.

Softener Formulations

With respect to the administration form, on the one hand it is possible to incorporate the polycarbonate-polyorganosiloxane and/or polyurethane-polyorganosiloxane compounds according to the invention into non-transparent softener dispersions or softener emulsions or transparent micro-emulsions or solutions.

Typical further components for such non-transparent or transparent formulations are:
quaternary ammonium compounds, preferably quaternary ammonium compounds containing alkanoic acid ester units; as softeners,
organic solvents, preferably mono- and polyhydric alcohols, such as ethanol, 2-propanol, ethylene glycol, 1,2-propylene glycol, hexylene glycol, dipropylene glycol; esters and ethers of glycols and oligoglycols, such as dipropylene glycol monobutyl ether, tripropylene glycol monomethyl ether, diethylene glycol diacetate, to improve the solubility and transparency of the formulation,
Diols and higher alcohols of longer-chain hydrocarbons, for example 2,2,4-trimethyl-1,3-pentanediol, to increase the solubilizability of the softener components,
nonionogenic surfactants, preferably alkoxylates of branched or unbranched C8 to C40 alcohols and fatty acid esters of alkylene oxides for stabilizing emulsions or preparation of micro-emulsions
Perfumes
Viscosity regulators
Dyestuffs
Perservatives The additional functional components listed and preferred representatives are known, for example, from U.S. Pat. No. 6,376,455.

On the other hand, it is possible to apply the polycarbonate-polyorganosiloxane and/or polyurethane-polyorganosiloxane compounds according to the invention to solid carriers in the context of laundry freshener systems, and then to bring these into contact, in the laundry dryer, with textiles which are to be freshened and/or softened. Laundry freshener systems with carriers and functional components thereof are known, for example, from U.S. Pat. Nos. 4,824,582, 4,808,086, 4,756,850, 4,749,596 and 3,686,025.

Typical components for such laundry freshener systems with carriers are:
fatty amines or complexes thereof with anionic surfactants as conditioning agent
quaternary ammonium compounds, preferably quaternary ammonium compounds containing alkanoic acid ester units, as softeners,
nonionogenic softeners, for example based on sorbitan esters or fatty alcohol alkoxylates
"soil release agents", for example based on cellulose ethers, guar gum or terephthalic acid block copolymers.

The carrier material is a sponge-like or porous sheet-like material which has a sufficient capacity for uptake of the laundry freshener formulation. "Woven" and nonwoven" materials are employed. They are materials based on natural or synthetic polymers, such as wool, cotton, sisal, linen, cellulose esters, polyvinyl compounds, polyolefins, polyamides, polyurethanes and polyesters.

The invention furthermore relates to a reactive composition comprising at least one compound of the formula (6)

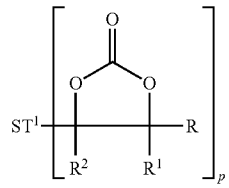

wherein R, $R^1$, $R^2$ and $ST^1$ are defined as above, and p≥2, and at least one compound of the formula (7)

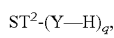

wherein $ST^2$ and Y are defined as above, and wherein q≥2, provided that at least one of the residues $ST^1$ and $ST^2$ comprises a polyorganosiloxane residue.

Preferably in this case, Y is $NR^6$ wherein $R^6$ is as defined above, particularly preferably hydrogen.

at least one compound of the formula (8)

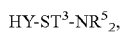

wherein ST³, Y and R⁵ are defined as above, and
at least one compound of the formula (10)

Q-ST⁴ᵛ  (10)

wherein Q is defined as above, and
provided that at least one of the residues ST¹, ST³ and/or ST⁴ comprises a polyorganosiloxane residue.

In this case R, R¹, R² preferably are, in each case, hydrogen, Y is preferably NR⁶, wherein R⁶ is as defined above, particularly preferably hydrogen.

The invention further relates to cured compositions, obtainable by curing the aforementioned reactive compositions. Curing of the reactive compositions is carried out, in particular, in order to prepare coatings on substrates, such as fibers, hard surfaces, such as on plastics, metal etc. Curing can take place at temperatures of from room temperature (20° C.) to about 250° C. As is explained above, it is also possible to use reactive cross-linking agents during or also after the reaction of the cyclic dicarbonates, such as, e.g., polyisocyanates.

It is also possible to prepare thermoplastic, elastomeric or duroplastic molded articles or sealants in this manner.

The present invention is illustrated in more detail by the following examples.

EXAMPLES

Example 1

Synthesis of a Carbonate-Terminated Siloxane

Under N₂, 400 g of an epoxy-terminated polyether of the structure

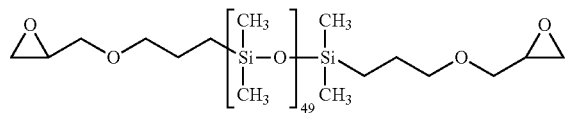

are mixed with 4 g tetrabutyl ammonium bromide and heated to 130° C. CO₂ is supplied at an overpressure of 200 mbar for a total of 19 hours.

Volatiles are then removed by heating within 1 hour at 130° C. in an oil-pump vacuum. Yield 326 g of a carbonate of the structure

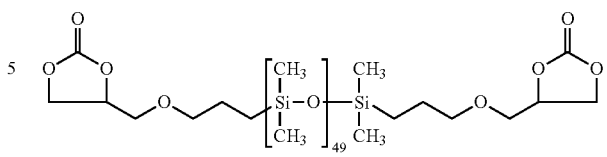

Example 2

Synthesis of a Block Copolymer Starting from a Siloxane-Based Carbonate

Under N₂, 50 g (12.47 mmol) of a carbonate-terminated siloxane according to Example 1

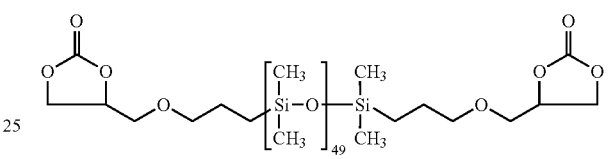

and 2.55 g (29.9 mmol) H₂NCH₂CH₂CH₂N(CH₃)₂ are heated to reflux temperature for 10 hours in 66 g 2-propanol. The conversion of the carbonate groups determined by ¹H-NMR is 96%. The batch is heated to reflux temperature for another 3 hours. Then 13.1 g (12.47 mmol) of a chloroacetic acid ester of the structure

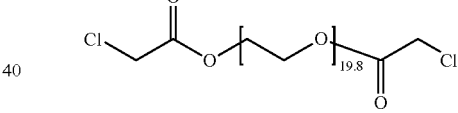

is added dropwise and the mixture is heated to reflux temperature for another 10 hours. A transparent, amber solution is obtained. The polymer contains the following structural elements

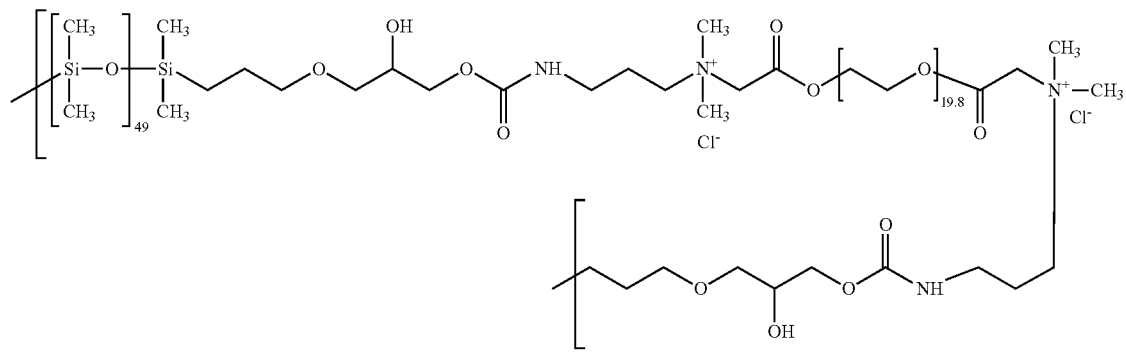

Example 3

Synthesis of a Carbonate-Terminated Hydrocarbon

Under $N_2$, 200 g of a commercially available epoxy-terminated polyether of the structure

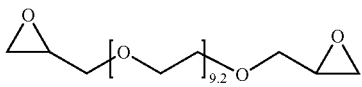

is mixed with 2 g tetrabutyl ammonium bromide and heated to 130° C.

$CO_2$ is supplied at an overpressure of 200 mbar for a total of 20 hours.

Volatiles are then removed by heating within 1 hour at 130° C. in an oil-pump vacuum. It was determined, with $^1$H-NMR spectroscopy, that the polyether carbonate formed

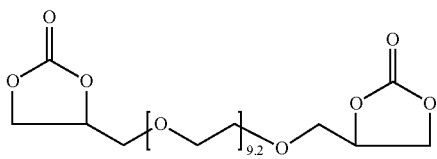

does not contain any epoxy groups anymore. Yield 203 g.

Example 4

Synthesis of a Block Copolymer Starting from a Hydrocarbon-Based Carbonate

Under $N_2$, 10 g (16 mmol) of the carbonate-terminated polyether according to Example 3

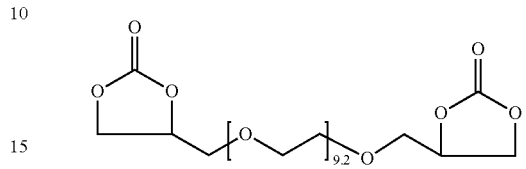

and 3.3 g (32 mmol) $H_2NCH_2CH_2CH_2N(CH_3)_2$ are dissolved in 59 g propylene glycol monomethylether and heated for 9 hours to 115-120° C. Then 45.5 g (16 mmol) of a chloroacetic acid ester of the structure

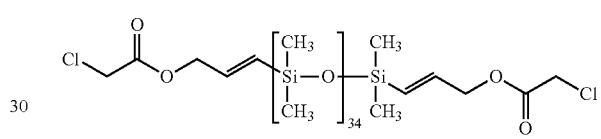

is prepared by Pt-catalyzed hydrosilylation of $CH{=}CCH_2OC(O)CH_2Cl$ with a corresponding $\alpha,\omega$-SiH terminated siloxane in analogy to WO 02/10256 Example 1, added dropwise, and the mixture is heated for another 10 hours to 120-125° C. A transparent, reddish solution is obtained. The polymer contains the following structural elements

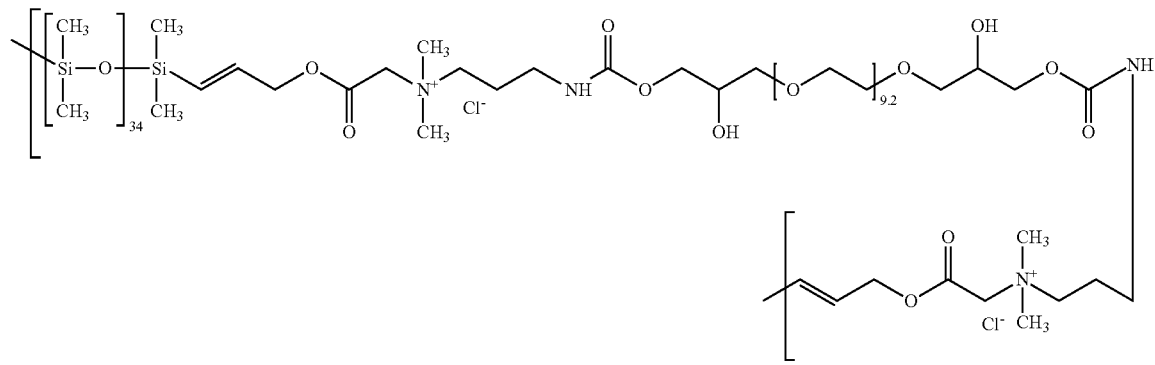

Example 5

Under $N_2$, 150 g (390 mmol $NH_2$; 2.6 mmol $NH_2$/g) of a commercially available ethoxy-funktionalized amino-siloxane of the structure

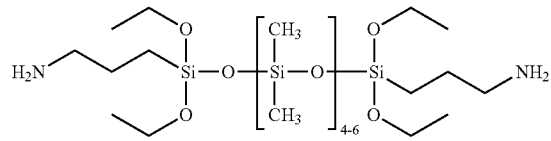

and a solution of 0.5 g KOH, in 1.5 g methanol are received in 180 g dipropylene glycol monobutylether. The mixture is heated to 120-130° C. After applying a slight vacuum (380 mm HO, 24.8 g of low boilers are distilled off. 0.6 g acetic acid are subsequently added. The batch is then heated to 135° C. for 0.5 hours, with a slight vacuum (380 mm Hg) being applied in order to remove residual volatiles.

289 g of a product are obtained with an amine content of 1.348 mmol $NH_2$/g and the structure

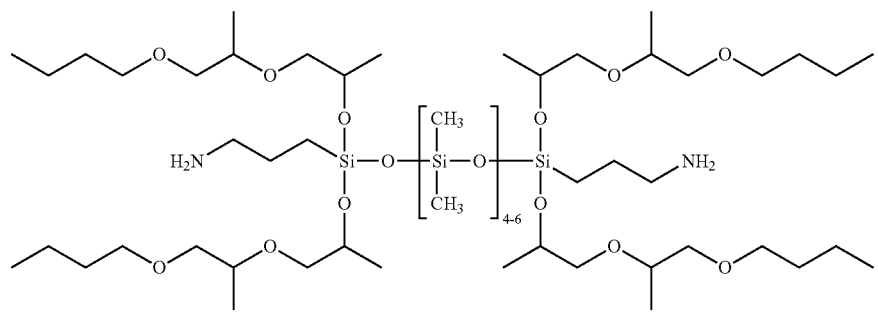

Example 6

Synthesis of a Carbonate-Terminated Polyurethane-Polyorganosiloxane Compound According to the Invention Under $N_2$, 9.25 g (12.47 mmol $NH_2$ groups; 1.348 mmol $NH_2$/g) of the alkoxy-functionalized amino-siloxane according to Example 5

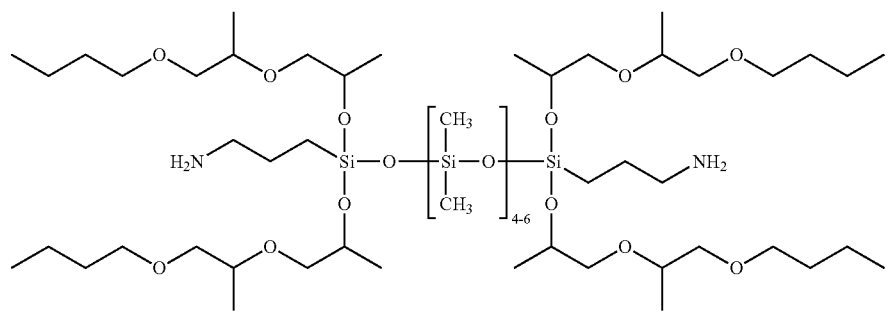

49.25 g (12.47 mmol corresponding to 24.94 mmol cyclocarbonate groups) of a carbonate-terminated siloxane of the structure

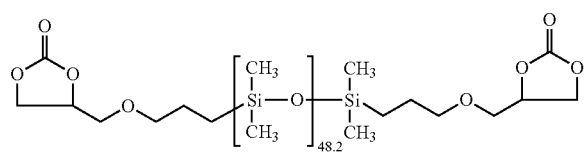

which was prepared in analogy to example 1, was dissolved in 61 g propylene glycol monomethylether and heated for 13 hours to 120-122° C. A compound of the formula is kept for another 9 hours at 120-122° C. Finally, 6.55 g (6.235 mmol) of a chloroacetic ester of the structure

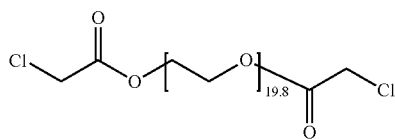

is added and the bnatch is stirred for 9 hours at 120-125° C.

A slightly opaque, yellowish, viscous solution is obtained, wherein the polymer has the following structural elements

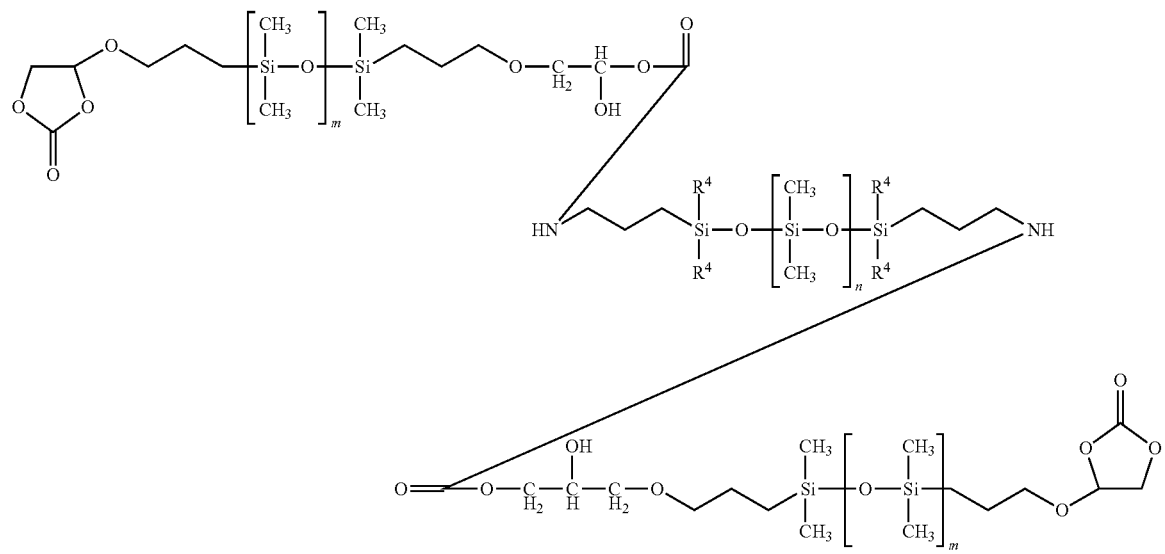

is obtained, wherein the indices m and n correspond to those of the starting materials and $R^4$ corresponds to alkoxy, as in the starting amine.

Example 7

Synthesis of the Block Copolymer with Alkoxysilyl Groups Capable of Cross-Linking 1.27 g (12.47 mmol) $H_2NCH_2CH_2CH_2N(CH_3)_2$ are added to the solution of the compounds of Example 6. The mixture ─┼─BLOCK 1─BLOCK 2─BLOCK 3─BLOCK 2─BLOCK 4─BLOCK 5─┼─   with

BLOCK 1:  Y—ST³—NR₂:

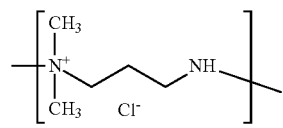

BLOCK 2: Car-ST¹-Car

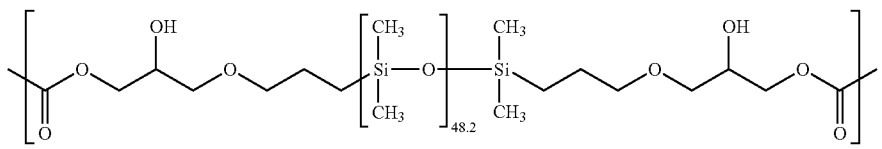

BLOCK 3: Y—ST²—Y:

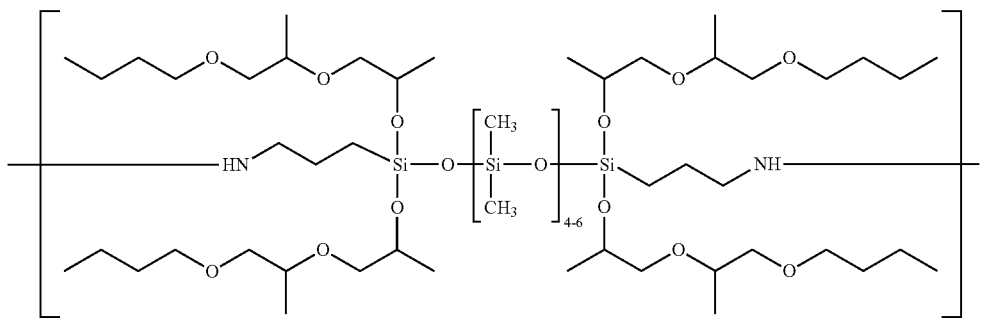

BLOCK 4: Y—ST³—NR₂:

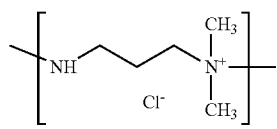

BLOCK 5: Q—ST⁴—Q:

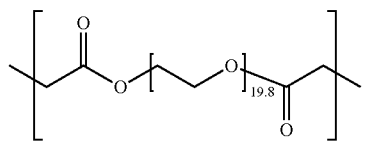

The polymers according to the Examples 2, 4, 6 and 7, in an amount of, for example, 0.5-3%, can be worked into powdery and liquid laundry detergents that are in particular based on anionic and/or non-ionogenic surfactants, and there exhibit their softening effect on the fiber materials to be cleansed.

Example 8

Synthesis of a Carbonate-Terminated Siloxane

Under $N_2$, 400 g of an epoxy-terminated polyether of the structure

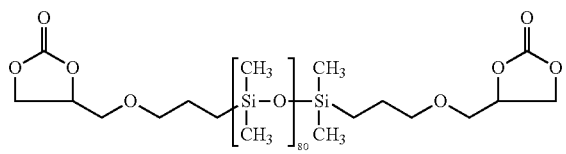

are mixed with 4 g tetrabutyl ammonium bromide and heated to 130° C.

$CO_2$ is supplied at an overpressure of 200 mbar for a total of 34 hours.

Volatiles are then removed by heating within 1 hour at 130° C. in an oil-pump vacuum. Yield 376 g of a carbonate of the structure

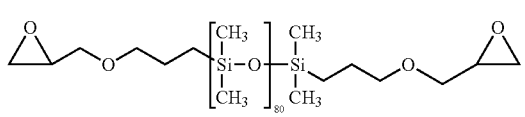

Example 9

Synthesis of a Carbonate-Terminated Hydrocarbon

Under $N_2$, 200 g of a commercially available epoxy-terminated polyether of the structure

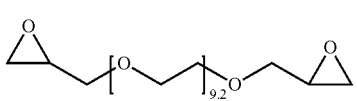

is mixed with 2 g tetrabutyl ammonium bromide and heated to 130° C.

$CO_2$ is supplied at an overpressure of 200 mbar for a total of 20 hours.

Volatiles are then removed by heating within 1 hour at 130° C. in an oil-pump vacuum. It was determined, with ¹H-NMR spectroscopy, that the polyether carbonate formed

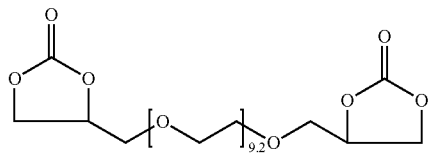

does not contain any epoxy groups anymore. Yield 203 g.

Example 10

Synthesis of a Block Copolymer, Starting from a Siloxane-Based Carbonate and a Hydrocarbon-Based Carbonate Under $N_2$, 55.8 g (8 mmol) of the carbonate-terminated siloxane according to Example 8

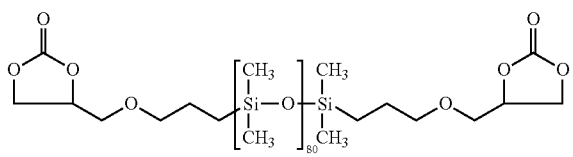

5 g (8 mmol) of the carbonate-terminated hydrocarbon according to Example 9

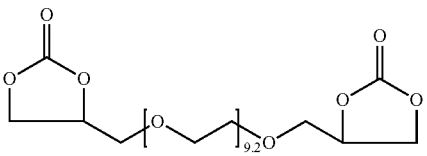

and 2.3 g (16 mmol) $H_2NCH_2CH_2CH_2N(CH_3)$ $CH_2CH_2CH_2NH_2$ are dissolved in 63 g propylene glycol monomethylether and heated for 12 hours to 118° C.

Then, 1.96 g (16 mmol) $ClCH_2C(O)OCH_2CH_3$ and 35 g propylene glycol monomethylether are added dropwise and the mixture is kept at 118° C. for another 8 hours. A slightly opaque viscous solution is obtained.

The polymer formed contains the following structural elements in a molar ration 1:1

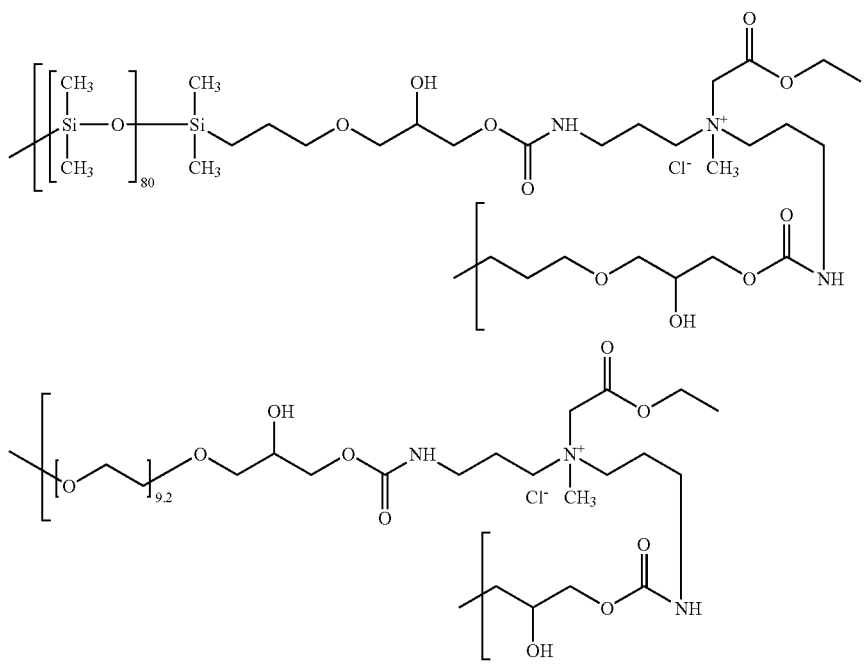

The polymer according to Example 10, preferably in an amount of 0.5-3%, can be worked into powdery and liquid laundry detergents that are in particular based on anionic and/or non-ionogenic surfactants, and there exhibits its softening effect on the fiber materials to be cleansed.

The invention claimed is:

1. A polyorganosiloxane compound including at least one of a polycarbonate group and a polyurethane group, containing at least one structural element of the formula (1):

(1)

$$\left[\overset{O}{\underset{\parallel}{C}}-O-CRR^1-CR^2-ST^1-CR^2-CRR^1-O-\overset{O}{\underset{\parallel}{C}}-Y-ST^2-Y\right]$$

with OH on CR² positions.

wherein
R is respectively selected from hydrogen, alkyl, or a bond to the residue $ST^1$, with cyclic structures forming if R represents a bond to the residue $ST^1$,
$R^1$ is respectively selected from hydrogen, alkyl, or a bond to the residue $ST^1$, with cyclic structures forming if $R^1$ represents a bond to the residue $ST^1$,
$R^2$ is respectively selected from hydrogen, alkyl, or a bond to the residue $ST^1$, with cyclic structures forming if $R^1$ represents a bond to the residue $ST^1$,
$ST^1$ is a di- or polyvalent, straight-chained, cyclic or branched, saturated, unsaturated or aromatic, substituted or unsubstituted hydrocarbon residue with up to 1000 carbon atoms, which may contain one or more groups selected from:
—O—,
—C(O)—, and
a polyorganosiloxane unit with 2 to 1000 silicon atoms,
wherein
$ST^1$ contains no groups of the formula —O—C(O)—O— and no groups of the formula —O—C(O)—NH—,
wherein, if a plurality of residues $ST^1$ is present, they may be the same or different,
Y is selected independently from one another from: —O—, —S— and —$NR^6$—, wherein
$R^6$ is hydrogen or a straight-chained, cyclic or branched, saturated, unsaturated or aromatic hydrocarbon residue with up to 40 carbon atoms, which may contain one or more groups selected from —O—, —C(O)—, —NH— and —$NR^3$—,
wherein $R^3$ is $R^3$ is a straight-chained, cyclic or branched, saturated, unsaturated or aromatic hydrocarbon residue with up to 40 carbon atoms, which may contain one or more groups selected from —O—, —C(O)— and —NH—, and may optionally be substituted by a silyl group or
$R^6$ represents a bond to the residue $ST^2$ while forming cyclic structures,
$ST^2$ is a di- or polyvalent, straight-chained, cyclic or branched, saturated, unsaturated or aromatic, substituted or unsubstituted hydrocarbon residue with up to 1000 carbon atoms, which may contain one or more groups selected from:

—O—, —C(O)—, —NH—, —$NR^3$—,

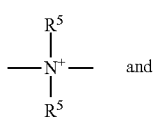

and a polyorganosiloxane unit with 2 to 1000 silicon atoms, wherein
$R^5$ is a straight-chained, cyclic or branched, saturated, unsaturated or aromatic hydrocarbon residue with up to 100 carbon atoms, which may contain one or more groups selected from —O—, —C(O)— and —NH—, and may optionally be substituted by a silyl group, or two residues $R^5$ form, with the nitrogen atom to which they are bonded, a 5 to 7-membered ring, which may optionally contain one or two further hetero atoms, or $R^5$, together with $R^6$, forms a divalent alkylene residue which leads to the formation of a cyclic structure including Y and $ST^2$,
wherein, if a plurality of residues $ST^2$ is present, they may be the same or different,
provided that at least one of the residues $ST^1$ and/or $ST^2$ comprises a polyorganosiloxane residue,
or acid addition compounds and/or salts thereof, wherein at least one of $ST^1$ and $ST^2$ contain a polyalkyleneoxy group.

2. The polyorganosiloxane compound including at least one of a polycarbonate group and a polyurethane group according to claim 1, wherein at least one of the residues R, $R^1$ and $R^2$ is hydrogen.

3. The polyorganosiloxane compound including at least one of a polycarbonate group and a polyurethane group according to claim 2, wherein the residues R, $R^1$ and $R^2$ are hydrogen.

4. The polyorganosiloxane compound including at least one of a polycarbonate group and a polyurethane group according to claim 1, wherein the compound is linear.

5. The polyorganosiloxane compound including at least one of a polycarbonate group and a polyurethane group according to claim 1, wherein $ST^1$ and $ST^2$ are each divalent residues.

6. The polyorganosiloxane compound including at least one of a polycarbonate group and a polyurethane group according to claim 1, wherein the compound is branched.

7. The branched polyorganosiloxane compound including at least one of a polycarbonate group and a polyurethane group according to claim 6, wherein the branching of the polymer chain takes place via at least one of the residues $ST^1$ or $ST^2$.

8. The polyorganosiloxane compound including at least one of a polycarbonate group and a polyurethane group according to claim 1, containing at least one polyorganosiloxane residue of the formula (2):

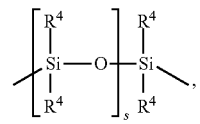

(2)

wherein
$R^4$ is a straight-chained, cyclic or branched, saturated, unsaturated or aromatic hydrocarbon residue with up to 20 carbon atoms, and/or $R^4$ is an alkoxy residue, the alkyl part of which is a straight-chained, cyclic or branched, saturated alkyl residue with up to 20 carbon atoms, which may contain one or more oxygen atoms, and s=1 to 999.

9. The polyorganosiloxane compound including at least one of a polycarbonate group and a polyurethane group according to claim 1, containing at least two structural elements of the formula (1).

10. The polyorganosiloxane compound including at least one of a polycarbonate group and a polyurethane group according to claim 1, containing at least two polyorganosiloxane residues of the formula (2).

11. The polyorganosiloxane compound including at least one of a polycarbonate group and a polyurethane group according to claim 1, wherein Y=—$NR^6$.

12. The polyorganosiloxane compound including at least one of a polycarbonate group and a polyurethane group according to according to claim 1, wherein Y=—NH—.

13. The polyorganosiloxane compound including at least one of a polycarbonate group and a polyurethane group according to claim 1, characterized in that it contains amino groups, protonated amino groups, quaternary ammonium groups and/or polyether groups.

14. The polyorganosiloxane compound including at least one of a polycarbonate group and a polyurethane group according to according to claim 1, wherein $ST^1 \neq ST^2$.

15. The polyorganosiloxane compound including at least one of a polycarbonate group and a polyurethane group according to according to claim 1, wherein $ST^1$ contains a structural element of the following formula:

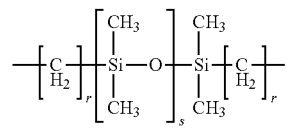

wherein s=1 to 999, and
r=1 to 12.

16. The polyorganosiloxane compound including at least one of a polycarbonate group and a polyurethane group according to claim 1, wherein $ST^2$ represents a residue of the formula (5)

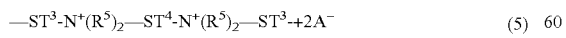

wherein
$ST^3$ is a di- or polyvalent, straight-chained or cyclic or branched, saturated or unsaturated or aromatic, substituted or unsubstituted hydrocarbon residue with 2 to 100 carbon atoms, which may contain —O—, —C(O)—, —NH— and/or —$NR^3$—, and $ST^4$ is a di- or polyvalent, straight-chained or cyclic or branched, saturated or unsaturated or aromatic, substituted or unsubstituted hydrocarbon residue with 2 to 100 carbon atoms, which may contain —O—, —C(O)—, —NH— and/or —$NR^3$—, and/or a polyorganosiloxane unit with 2 to 500, and $A^-$ is an organic or inorganic anion.

17. The polyorganosiloxane compound including at least one of a polycarbonate group and a polyurethane group according to claim 1, having the following formula (3)

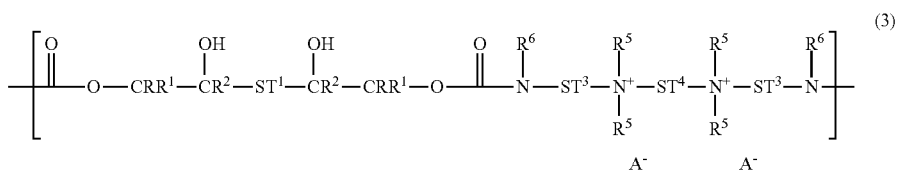

wherein
$ST^4$ is a di- or polyvalent, straight-chained or cyclic or branched, saturated or unsaturated or aromatic, substituted or unsubstituted hydrocarbon residue with 2 to 100 carbon atoms, which may contain —O—, —C(O)—, —NH—and/or —$NR^3$—, and/or a polyorganosiloxane unit with 2 to 500, $A^-$ is an organic or inorganic anion, provided that at least one of the residues $ST^1$, $ST^3$ and $ST^4$ contains a polyorganosiloxane residue.

18. The polyorganosiloxane compound including at least one of a polycarbonate group and a polyurethane group according to claim 1, wherein at least one of $ST^1$ and $ST^2$ is selected from the group consisting of polyorganosiloxane-containing residues, polyether-containing residues, polyorganosiloxane- and polyether-containing residues, monocyclic or polycyclic hydrocarbon residues, acyclic, optionally oxygen-containing hydrocarbon residues and optionally oxygen-containing hydrocarbon residues comprising aromatic groups.

19. A composition comprising the polyorganosiloxane compound including at least one of a polycarbonate group and a polyurethane group according to claim 1, wherein the composition is selected from the group consisting of coatings, agents for surface modification, elastomers, duromers, adhesives, primers for metal or plastic surfaces, polymer additives, laundry detergent additives, rheological agents, cosmetic agents, fiber modification agents.

20. The composition of claim 19, wherein the composition is a modification agent for thermoplastic synthetic materials.

21. The composition of claim 20, wherein the modification agents are low-temperature impact-resistance modifiers.

22. The composition of claim 20, wherein the modification agent is selected from the group consisting of
viscosity regulators;
anti-static agents;
anti-fogging agents;
mixture components for silicone rubbers that can be cross-linked peroxidically or by hydrosilylation using platinum catalysis to form elastomers;

softeners for textile fibers for the treatment of textile fibers prior to, during and after washing,
agents for modifying fibers and fabrics selected from the group consisting of natural and synthetic fibers, hair, cotton fibers, synthetic fibers, polyester fibers, polyamide fibers, union fabric;
textile finishing agents;
softeners for detergent-containing formulations, and
laundry detergents and cleaning products.

* * * * *